(12) United States Patent
Gunther et al.

(10) Patent No.: US 12,074,865 B1
(45) Date of Patent: Aug. 27, 2024

(54) TECHNIQUES FOR SIGNING INTO A USER ACCOUNT USING A TRUSTED CLIENT DEVICE

(71) Applicant: Apple Inc., Cupertino, CA (US)

(72) Inventors: Max M. Gunther, San Francisco, CA (US); Onar Vikingstad, San Jose, CA (US); Ramiro Calvo, Palo Alto, CA (US); Isabella M. Funke, San Francisco, CA (US); Eric D. Friedman, Berkeley, CA (US); Hervé Sibert, Le Mans (FR); David P. Remahl, Woodside, CA (US); Yannick L. Sierra, San Francisco, CA (US); Frank B. Dancs, San Carlos, CA (US); Sudhakar N. Mambakkam, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 426 days.

(21) Appl. No.: 16/252,515

(22) Filed: Jan. 18, 2019

Related U.S. Application Data

(60) Provisional application No. 62/620,393, filed on Jan. 22, 2018.

(51) Int. Cl.
*H04L 29/06* (2006.01)
*G06F 21/71* (2013.01)
(Continued)

(52) U.S. Cl.
CPC .......... *H04L 63/0838* (2013.01); *G06F 21/71* (2013.01); *G06K 7/1417* (2013.01);
(Continued)

(58) Field of Classification Search
CPC ............. H04L 63/0838; H04L 63/0853; H04L 63/0861; H04L 63/18; H04L 9/3213;
(Continued)

(56) References Cited

U.S. PATENT DOCUMENTS

| 5,208,853 A | 5/1993 | Armbruster et al. |
| 6,731,755 B1 | 5/2004 | Cocks |

(Continued)

FOREIGN PATENT DOCUMENTS

| WO | 2017106793 A1 | 6/2017 |

OTHER PUBLICATIONS

"Cryptographic Storage Cheat Sheet", OWASP, https://www.owasp.org/index.php Cryptographic_Storage_Cheat_Sheet, Last revision Jun. 18, 2018, 11 pages.
(Continued)

*Primary Examiner* — Jeffrey C Pwu
*Assistant Examiner* — Nega Woldemariam
(74) *Attorney, Agent, or Firm* — DICKINSON WRIGHT RLLP

(57) ABSTRACT

This application relates to establishing a communication session between a host device and a trusted client device. A host device generates a one-time secret (OTS) and transmits the OTS to a trusted client device via an out-of-band communication channel. The trusted client device verifies an identity of a user of the trusted client device utilizing one or more sensors of the trusted client device. Responsive to verifying the identity of the user, the trusted client device negotiates an encryption key with the host device based on the OTS. The trusted client device then establishes a communication session with the host device utilizing the encryption key. The communication session can be utilized to pass credentials in a protected manner from the trusted client device to the host device that enable the host device to access a user account associated with a service.

20 Claims, 15 Drawing Sheets

(51) Int. Cl.
*G06K 7/14* (2006.01)
*G06K 19/06* (2006.01)
*H04L 9/08* (2006.01)
*H04L 9/32* (2006.01)
*H04L 9/40* (2022.01)
*H04L 65/1069* (2022.01)

(52) U.S. Cl.
CPC ...... *G06K 19/06037* (2013.01); *H04L 9/0869* (2013.01); *H04L 9/3213* (2013.01); *H04L 9/3228* (2013.01); *H04L 63/0428* (2013.01); *H04L 63/061* (2013.01); *H04L 63/0853* (2013.01); *H04L 63/0861* (2013.01); *H04L 63/102* (2013.01); *H04L 63/108* (2013.01); *H04L 63/18* (2013.01); *H04L 65/1069* (2013.01)

(58) Field of Classification Search
CPC ... H04L 9/0869; H04L 63/108; H04L 63/061; H04L 9/3228; H04L 65/1069; H04L 63/102; H04L 63/0428; G06F 21/71; G06K 7/1417; G06K 19/06037
USPC .......................................................... 713/168
See application file for complete search history.

(56) References Cited

U.S. PATENT DOCUMENTS

| | | | |
|---|---|---|---|
| 8,259,948 B2 | 9/2012 | Smith et al. | |
| 8,892,868 B1 | 11/2014 | Jenks et al. | |
| 9,369,279 B2 | 6/2016 | Harjula et al. | |
| 10,219,154 B1* | 2/2019 | Hallock | H04L 63/0853 |
| 2009/0154709 A1 | 6/2009 | Ellison | |
| 2010/0008249 A1 | 4/2010 | Rosenblatt et al. | |
| 2012/0266224 A1 | 10/2012 | Gruschka et al. | |
| 2013/0008594 A1 | 1/2013 | Takeuchi et al. | |
| 2013/0031623 A1 | 1/2013 | Sanders | |
| 2013/0111208 A1 | 5/2013 | Sabin et al. | |
| 2013/0124855 A1 | 5/2013 | Varadarajan et al. | |
| 2013/0167208 A1 | 6/2013 | Shi | |
| 2013/0232344 A1* | 9/2013 | Johnson | G06F 21/645 713/193 |
| 2014/0112470 A1 | 4/2014 | Shen et al. | |
| 2014/0310527 A1 | 10/2014 | Veugen et al. | |
| 2014/0337634 A1 | 11/2014 | Starner et al. | |
| 2016/0080157 A1 | 3/2016 | Bettenburg et al. | |
| 2016/0321460 A1 | 11/2016 | Suter et al. | |
| 2017/0034141 A1 | 2/2017 | Oberheide et al. | |
| 2017/0346851 A1* | 11/2017 | Drake | H04L 63/0428 |
| 2018/0041339 A1* | 2/2018 | Lee | H04L 63/0838 |
| 2018/0183778 A1 | 6/2018 | Lundstrm | |

OTHER PUBLICATIONS

"Key rotation, Rotation in Cloud KMS", https://cloud.google.com/kms/docs/key-rotation, Last Updated May 9, 2018 (Retrieved Online Aug. 14, 2018), 3 pages.

"AWS Key Management Service Cryptographic Details", Amazon Web Services—AWS KMS Cryptographic Details, https://d0.awsstatic.com/whitepapers/KMS-Cryptographic-Details.pdf; Aug. 2018, 43 pages.

Günther et al.; "Online Banking with NFC-Enabled Bank Card and NFC-Enabled Smartphone", Security Theory and Practice. Security of Mobile and Cyber-Physical Systems 2013 / Lecture Notes in Computer Science 7886 Springer 2013, Department of Computer Science, University of Tübingen, Germany, May 2013, 16 pages.

Günther et al.; "Indirect NFC-Login", 8th International Conference for Internet Technology and Secured Transactions /Institute of Electrical and Electronics Engineers (IEEE ), publication date Dec. 9, 2013, 6 pages.

* cited by examiner

TECHNIQUES FOR SIGNING INTO A USER ACCOUNT USING A TRUSTED CLIENT DEVICE

CROSS-REFERENCE TO RELATED APPLICATIONS

The present application claims the benefit of U.S. Provisional Application No. 62/620,393, entitled "SECURE SIGN IN TO A USER ACCOUNT USING A TRUSTED CLIENT DEVICE," filed Jan. 22, 2018, the content of which is incorporated herein by reference in its entirety for all purposes.

FIELD

The described embodiments relate generally to online security. More particularly, the present embodiments relate to a technique for providing authentication of a user's identity utilizing a trusted client device.

BACKGROUND

The Internet provides an elastic platform for enabling many different types of services to be implemented for a large variety of different client devices. Service providers can implement services, accessible over the Internet, to perform a plethora of different tasks. Many of the services require various forms of authentication to provide security for data associated with the service. Online banking is a good example of a service that requires various levels of security to protect account data associated with a large number of the bank's customers.

Any service provider that creates and manages a large number of user accounts is likely to implement some type of security protocol to access the user account. In some instances, a security protocol can require a user to authenticate themselves by entering credentials (e.g., a username and password) corresponding to the user account, which can be referred to as one-factor authentication. In other instances, the security protocol can require two-factor authentication, which provides additional security by requiring verification of the client device used to access the service, such as by checking a network address or a security token assigned to the client device. Notably, when a user account is accessed using a client device that has not been previously verified, a user can be prompted to enter a verification code, in addition to the credentials, in order to complete the authentication process. Typically, a verification code will be delivered to the user using an automated phone message or a text message sent to a phone number registered to the user account. The user is then prompted to enter the verification code using the client device to ensure the client device is controlled by the user. Notably, two-factor authentication is more invasive from a user's perspective and involves the user taking additional active steps to enter multiple credentials to access the user account. In addition, two-factor authentication requires the user to have configured a user account with a trusted phone number to receive the verification code and for the user to have direct access to a device capable of receiving a message at that phone number, which may be problematic if the user does not have the device on their person or if the user is located in an area outside of the network where the device is unable to receive the message.

SUMMARY

In view of the foregoing, what is desired is an improved technique for establishing a communication session between a host device and a trusted client device. In this regard, the embodiments described herein set forth techniques for providing a security protocol for negotiating an encryption key that enables data to be transmitted in a protected manner between the host device and the trusted client device.

In some embodiments, a host device generates a one-time secret (OTS) and transmits the OTS to a trusted client device via an out-of-band communication channel. The trusted client device verifies an identity of a user of the trusted client device utilizing one or more sensors of the trusted client device. Responsive to verifying the identity of the user, the trusted client device negotiates an encryption key with the host device based on the OTS. The trusted client device then establishes a communication session with the host device utilizing the encryption key.

In some embodiments, a host device and a trusted client device implement a security protocol to share credentials for accessing a user account through the established communication session. The user account is maintained by a service provider and associated with a service provided over the Internet. The security protocol includes a number of steps executed by the host device and the trusted client device. The security protocol begins when a host device requests a session identifier from a pairing service associated with a relay server. The relay server is utilized to establish a protected communication session between the trusted client device and the host device for sharing the credentials, and the session identifier identifies a particular communication channel, implemented through the relay server, over which the protected communication session is established. Alternatively, the relay server may be bypassed and the protected communication session can be established on a communication channel connecting the trusted client device directly to the host device.

In some embodiments, the OTS is encoded within a representation of a session identifier that is transmitted by the host device to the trusted client device via the out-of-band communication channel. In some embodiments, the OTS is a random number generated by the host device and encoded with m-bits. The session identifier can be requested from a pairing service associated with a relay server, which creates a relay connection for establishing the communication channel, indirectly, between the host device and the trusted client device. In some embodiments, the host device generates a Quick Response (QR) code and encodes the session identifier and/or the OTS in the QR code. The QR code is displayed by the host device and can be received at the trusted client device via an application configured to capture an image of the QR code using an image sensor.

In some embodiments, the trusted client device verifies the identity of a user of the trusted client device utilizing biometric data collected via one or more sensors of the trusted client device. The sensors can include one or more of an image sensor, a depth sensor, a fingerprint sensor, and/or a microphone. Once the identity of the user has been verified, an identification service provides credentials to the trusted client device that can be utilized to access the user account. In some embodiments, the identification service issues a machine token to the trusted client device such that the trusted client device can be associated with the user account.

In some embodiments, the trusted client device calculates a shared secret private key K based on the OTS. The host device also calculates the shared secret private key K based on the OTS. In some embodiments, the host device and the trusted client device can negotiate the shared secret private key K utilizing a password-authenticated key exchange (PAKE) protocol such as a Secure Remote Password (SRP) protocol. The shared secret private key K is then used to encrypt the credentials, which are transmitted from the trusted client device to the host device within the communication session that is now protected using the shared secret private key K known only by the host device and the trusted client device. The host device decrypts the credentials and can utilize the credentials to access the user account through a service accessible via a network.

In various embodiments, the credentials are ephemeral credentials that are only valid for a duration of time. The ephemeral credentials can be referred to as a password equivalent token (PET) that is different than conventional credentials for accessing the user account that consist of a username, a password, and/or an optional verification code.

In some embodiments, verifying the identity of the user comprises collecting biometric data utilizing an image sensor and a depth sensor. In other embodiments, verifying the identity of the user comprises collecting biometric data utilizing a fingerprint sensor. In yet other embodiments, verifying the identity of the user comprises requesting a secure enclave processor (SEP) to verify the identity of the user.

In various embodiments, a communication session can be established on a communication channel that connects the trusted client device directly to the host device. The communication channel does not pass through the relay server. The trusted client device can connect to the host device directly through a wired connection, a WiFi® connection, a Bluetooth® low energy connection, an infrared connection, or any other technically feasible communication channel.

In some embodiments, a single service provider maintains and/or controls the pairing service, the identification service, and/or the service associated with the user account. In other embodiments, the pairing service and/or the identification service can be maintained and/or controlled by a third-party service provider that is different from the service provider that maintains and/or controls the service associated with the user account. For example, the pairing service and relay server can be maintained and operated by a first service provider and the identification service and the service associated with the user account can be maintained and operated by a second service provider.

Other aspects and advantages of the application will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
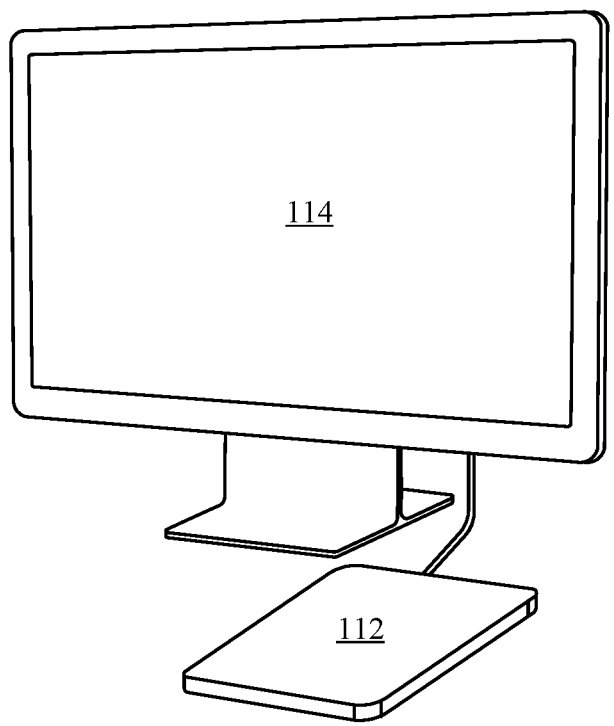
FIG. 1 illustrates various computing devices that can be configured to implement different aspects of the various techniques described herein, in accordance with some embodiments.
Figure 1:
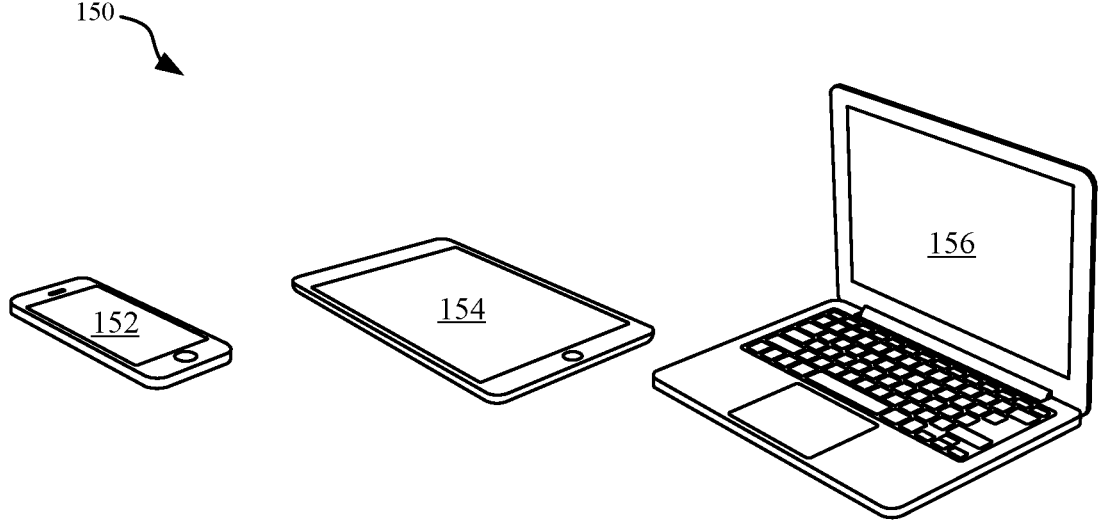

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Users entrust service providers with a vast amount of personal data that is stored on various servers and accessible over a network such as the Internet. The service providers are responsible to implement techniques that promote the protection of certain private information included in the personal data. For example, some user accounts may be associated with a user's home address, phone number, or even social security number. The personal data could be used to steal a user's identity or other unscrupulous purposes that could harm the user. Various technologies exist for providing online security to protect data associated with a user account. Improvements to these technologies are needed to enhance a user experience and/or improve the security of data. However, improving security, such as by requiring more complex credentials or using multi-factor authentication, can degrade the user experience as credentials become harder to remember or a user is required to complete more complex security protocols.

Notably, a user account can be associated with various client devices known to belong to a particular user. These "trusted" client devices, such as a user's mobile phone or laptop computer, provide one factor of authentication when a user attempts to access data corresponding to a particular user account using the trusted client device. Other factors of authentication can also be used to provide additional security. For example, the user can be prompted to provide additional credentials using the trusted client device. Some client devices can also include various sensors that can be used to verify the identity of the user using biometric data, such as a fingerprint.

However, users may not always want to access a service using a trusted client device. For example, a user may want to borrow a friend's laptop to sign in to a mobile banking application to check an account balance or transfer money; a user may want to access a music library over a friend's smart speaker; or a user may want to watch their favorite program using a set top box in their hotel room. These devices are not trusted client devices because the devices are not owned or controlled by the user. Simply requesting the user to provide credentials (e.g., a username and password) using the device is not a particularly strong level of security. Furthermore, providing the credentials via the untrusted device could open up the user account to phishing attacks. One well-known solution to this problem is utilizing two-factor authentication that requires an additional step of typing a verification code into the device, the verification code being sent to the user via a phone number associated with the user account. Two-factor authentication increases the level of security, but two-factor authentication can also be reflected in a poorer user experience due to the additional steps the user is required to perform.

An improvement to these technologies can be implemented with a security protocol that utilizes a trusted client device to provide credentials to a host device that is being used by a user to access a service associated with a user account. The trusted client device is utilized by the user to provide multi-factor authentication to access the user account through the service from the host device. In some embodiments, the host device exchanges a session identifier and a random secret with a trusted client device via an out-of-band communication channel. The trusted client device verifies the identity of the user using biometric data and requests temporary credentials associated with the user account from a server. The temporary credentials are only provided after the identity of the user is verified by the server. The random secret communicated to the trusted client device is utilized to generate an encryption key for encrypting the temporary credentials at the trusted client device. The encrypted credentials are then transmitted to the host device through a protected communication channel. The host device can decrypt the temporary credentials utilizing the encryption key and submit the temporary credentials to a server to access the user account via the service.

In some embodiments, when the host device has not previously attempted to access the user account via the service, the host device can prompt the user to enter a verification code transmitted to the user via the trusted client device. However, if the host device has previously accessed the user account via the service, the verification code is not required.

The security protocol described above utilizes a communication channel established between the trusted client device and the host device. The communication channel is protected by encrypting traffic transmitted through the communication channel with the shared encryption key that is negotiated between the trusted client device and the host device based on the secret. Consequently, even though the communication channel can be relayed through servers controlled by a third party, those servers are unable to decrypt the data transmitted through the communication channel. A similar protocol can be utilized for other purposes other than sharing ephemeral credentials with the host device in order to enable the host device to access a user account. For example, encrypted data can be passed over the communication channel that enables the trusted client device and the host device to interact, such as using the trusted client device to view sensitive health information downloaded from a server to the host device or utilizing the trusted client device as a remote control for the host device. The communication channel can also be established directly between the host device and the trusted client device, without requiring the session identifier to be passed from the host device to the trusted client device to establish the communication channel through a relay server.

These and other embodiments are discussed below with reference to FIGS. 1-11; however, those skilled in the art will readily appreciate that the detailed description given herein with respect to these figures is for explanatory purposes only and should not be construed as limiting.

FIG. 1 illustrates various computing devices that can be configured to implement different aspects of the techniques described herein, in accordance with some embodiments. The computing devices shown in FIG. 1 can be configured to implement a security protocol that enables a host device 110 to access a user account utilizing a trusted client device 150. As used herein, a "user account" refers to a particular account, profile, data structure, or the like corresponding to a user that is associated with a service provided by a service provider having a number of unique users. For example, user accounts can be associated with digital distribution platforms and a corresponding service configured to deliver applications or multimedia content to one or more client devices. User accounts can also be associated with other types of services, such as, but not limited to, mobile banking services, communications services, data storage services, health information services, and the like. A service provider can maintain different user accounts for a number of different users, each user account corresponding to a unique user identifier assigned to a particular user. The user account can also be associated with credentials, such as a username and password, which enable a client device to access the user account through the service.

In some embodiments, a user account can be associated with one or more trusted client devices 150. As used herein, a "trusted client device" refers to a particular hardware device that is verified as being associated with a particular user or user account. For example, a particular user may own or control a mobile phone 152, a tablet computer 154, and/or a laptop computer 156 that the user can choose to associate with a user account for a particular service.

In some embodiments, a service provider provides means for a user to associate a particular device with the user account as a trusted client device. For example, a service provider can enable a user to connect to the user account from a client device using credentials associated with the user account that are provided to the user. The credentials can include a username and password configured to access the user account. In various embodiments, the service provider can also require a second form of authentication to verify that the client device is maintained, owned, or otherwise controlled by the user. For example, the user could be asked to provide a phone number when the user or service provider sets up the user account in the first instance. When a client device attempts to access the user account for the first time using the credentials, the client device can prompt the user to enter a verification code supplied to the user via the phone number, such as via a voice message or a text message sent to the provided phone number. Entering the verification code using the client device provides another level of security that the client device is associated with the user. Once the user has entered the proper credentials and, optionally, the verification code, the client device is associated with the user account as a trusted client device 150.

In some embodiments, a unique identifier for the client device is stored by the service provider and associated with the user account. A machine token or device identifier (deviceID) can be issued to and stored on the client device. The user account is associated with the machine token in a data structure maintained by the service provider. The data structure can associate zero or more machine tokens with a single user account, where multiple machine tokens associated with the single user account correspond to multiple trusted client devices 150 associated with the single user account. In other embodiments, a media access control (MAC) address assigned to a network controller of the client device or, alternatively, a network address such as an Internet Protocol (IP) address can be stored by the service provider to uniquely identify the client device as a trusted client device 150. It will be appreciated that a machine token can be associated with multiple user accounts, such as when multiple users having different user accounts share the same client device or when the same user maintains multiple user accounts for a given service.

Once a client device is associated with the user account as a trusted client device 150, the trusted client device 150 is allowed to access the user account through the service by simply supplying the credentials to the service. The additional authorization step of providing the verification code transmitted to the phone number associated with the user account is not required when accessing the user account from a trusted client device 150. However, there are times when a user may wish to access the user account from a device that is not controlled or owned by the user. In other words, there are times when a user would like to access the user account from a new device without verifying the new device as a trusted client device 150. Still, the service provider can require multi-factor authentication when the user attempts to access the user account from the new device. The multi-factor authentication can require the user to enter a verification code sent to the provided phone number. The service provider can also prompt the user as to whether the user would like the new device to be authenticated as a trusted client device 150. The multi-factor authentication can help prevent unauthorized access of the user account, which is a security benefit that helps protect the private information stored and/or associated with the user account. However, the steps for implementing the multi-factor authentication require additional steps to be performed by the user, which can lead to a less than desirable user experience. Thus, there is a need to improve the implementation of a security protocol utilized to access the user account from a device in a protected manner.

In some embodiments, a host device 110 is configured to connect to a service associated with a user account and accessible over a network. The service can be configured to prompt the user of the host device 110 to sign in to the user account using credentials or, alternatively, using a trusted client device 150. As shown in FIG. 1, the host device 110 can include a set top box 112 connected to a display 114. It will be appreciated that, in other embodiments, the host device 110 can be implemented as a laptop computer, a desktop computer, a tablet computer, a terminal system (e.g., an automated teller machine—ATM), a wearable device (e.g., a smart watch), an Internet of Things (IoT) device, or any other type of device capable of accessing a user account over a network. For example, a user could connect to the service through a friend's laptop computer. Alternatively, the user could connect to a mobile banking service through an ATM using a trusted client device 150 rather than a debit card. In another example, a user could connect to a fitness tracking service using a smart fitness tracker borrowed from someone else by the user. It will be appreciated that the types of host devices 110, and the services accessible therefrom, are vast and that different implementations of the host device 110 and/or the service associated with the user account are contemplated as being within the scope of the present application.

In some embodiments, the host device 110 connects to a cloud-based service associated with a plurality of user accounts. The host device 110 can include an application or process configured to communicate with the service over a network using one or more protocols. For example, the set top box 112 can include a client application, stored in a memory of the set top box 112 and executing on a processor of the set top box 112, and the client application is configured to connect to the service over the Internet using a network address for the service. The network address can include an IP address for a server associated with the service provider and configured to implement one or more aspects of the service. In some embodiments, the service can implement an application programming interface (API) that enables the client application on the host device 110 to interface with the service. For example, a representational state transfer (RESTful) API could be implemented by one or more processes on the server that enables a host device 110 to make calls to the service using a specific uniform resource locator (URL) formatted according to the RESTful API and transmitted to the server using hypertext transfer protocol (HTTP) messages. The server can also transmit responses to the calls to the host device 110 using HTTP messages.

In some embodiments, the security protocol implemented by the service allows the user to sign in to a user account using a different technique that utilizes a trusted client device 150 to complete a multi-factor authentication process without requiring the user to manually enter credentials or provide a verification code sent to a phone number or email address associated with the user account. Notably, an identity of a user in control of a trusted client device 150 can be assumed because the trusted client device 150 was previously verified as being associated with the user account. Consequently, a first factor of authentication when signing in to a user account involves comparing a machine token of the trusted client device 150 to verify the machine token is associated with the user account. The security protocol can also implement additional factors of authentication using biometric data collected via sensors included in the trusted client device 150. For example, facial recognition software can be utilized by the trusted client device 150 to verify the identity of a user using an image sensor that captures an image of the user's face as well as, optionally, a depth sensor. Alternatively, fingerprint software can be utilized by the trusted client device 150 to verify the identity of a user using a fingerprint sensor that scans a fingerprint of the user. Alternatively, voice recognition software can be utilized by the trusted client device 150 to verify the identity of a user using a microphone that captures an audio recording of the user's voice. Generally, biometric data collected by one or more sensors included in the trusted client device 150 can be utilized to verify a user's identity as part of the security protocol. The combination of (1) verifying that a device is a trusted client device 150 and (2) verifying that an identity of a user of the trusted client device 150 is that of an authorized user of the trusted client device provides two-factor authentication that obviates the need for the user to manually enter credentials at the trusted client device 150 or the host device 110.

Accordingly, FIG. 1 provides a high-level overview of various computing devices that can be configured to operate in concert to implement the various techniques set forth herein. A more detailed breakdown of these techniques will now be described below in conjunction with FIGS. 2-11.

Figure 2:
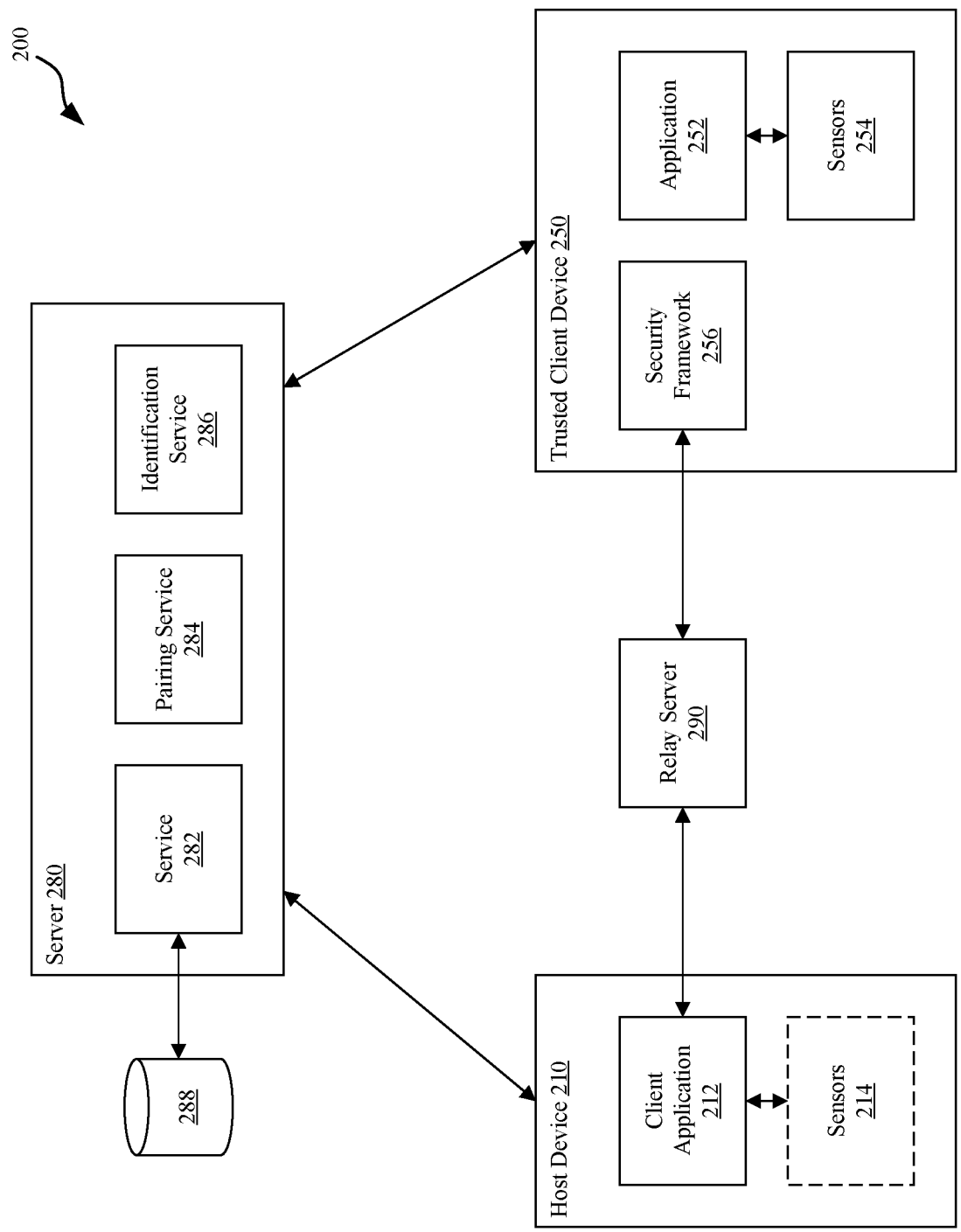
FIG. 2 illustrates a system configured to implement a security protocol utilized to access a user account, in accordance with some embodiments.

FIG. 2 illustrates a system 200 configured to implement a security protocol utilized to access a user account, in accordance with some embodiments. The security protocol enables a host device 210 to access a user account in a protected manner. As shown in FIG. 2, the host device 210 is connected to a server 280 via a network, such as the Internet. A client application 212 executing on the host device 210 is configured to connect to a service 282 executing on the server 280. The service 282 is configured to access a memory 288 that stores data related to a plurality of user accounts. The memory 288 can include a database of the user accounts. The memory 288 can also include data associated with the user accounts, such as data structures that store machine tokens for trusted client devices 150 associated with each user account, user profiles that store data for verifying a user's identity, and personal data corresponding to a user that can be accessed through a corresponding user account. The memory 288 can be local, such as a hard disc drive (HDD) or solid state drive (SSD) connected to the server, or remote, such as a virtual drive accessible through a storage server connected to a drive array or a cloud-based distributed storage service accessible over a network.

In some embodiments, the client application 212 is a browser application configured to receive web pages (e.g., hypertext markup language—HTML) and/or multimedia content via the network and display a representation of the web pages or multimedia content to a user via a display of the host device 210. The browser application can also execute various functions built-in to the browser functionality or included in the web pages received over the network as scripts or other embedded code. It will be appreciated that the client application 212 is not limited to the functionality of a browser application. In various embodiments, the client application 212 can be a process configured to implement at least a portion of the security protocol. For example, the set top box 112 or other device could implement an operating system that is configured to implement at least a portion of the security protocol. As another example, a streaming application or mobile banking application could implement at least a portion of the security protocol.

The security protocol can require the client application 212, executing on the host device 210, to communicate with a pairing service 284 executing on the server 280. For example, a web page loaded by the client application 212 can include a script that causes the client application 212 to generate an HTTP message directed to the pairing service 284. The HTTP message can request a session identifier for a communication session from the pairing service 284. The pairing service 284 is configured to generate session identifiers that enable the host device 210 to communicate with a trusted client device 250 via a relay server 290. In response to receiving the request, the pairing service 284 can configure the relay server 290 to allocate a communication channel for the communication session between the host device 210 and the trusted client device 250. The relay server 290 can generate a session identifier for the communication session and transmit the session identifier to the pairing service 284, which forwards the session identifier to the client application 212 in a response to the initial request.

In some embodiments, the session identifier is an ephemeral token that has an expiration date (e.g., a time to live—TTL). The expiration date represents a duration of time that the communication channel allocated by the relay server 290 for the communication session between the host device 210 and the trusted client device 250 will remain valid. The expiration date can be encoded within the session identifier or associated with the session identifier and stored within a data structure in the server 280 or a data structure in the relay server 290.

The security protocol also requires the host device 210, via the client application 212, to generate a seed value that is utilized to generate a shared secret key for encrypting communications within a protected communication session. The seed value is referred to herein as a OTS. In some embodiments, the OTS is a random number generated by the host device 210 and associated with the session identifier. The OTS is utilized by the host device 210 and the trusted client device 250 to calculate a private key, known by both the host device 210 and the trusted client device 250, which is utilized to encrypt data transmitted through the relay server 290 within the protected communication session. In other embodiments, the OTS can be selected as a random value within a range of values. For example, the OTS can be selected as a random m-digit value, such as a random value between 0 and 999999 when m is equal to six.

The security protocol requires the host device 210, via the client application 212, to generate a representation of the session identifier and provide the representation to the trusted client device 250 via an out-of-band communication channel. In some embodiments, the representation encodes the session identifier within a QR code that is presented on a display of the host device 210. The OTS can also be encoded within the representation of the session identifier or, alternatively, the OTS can be encoded within a separate representation of the OTS, such as by encoding the OTS within a second QR code. As used herein, an "out-of-band communication channel" refers to an indirect communication channel between two devices. The out-of-band communication channel can be contrasted with an "in-band communication channel" where two or more devices are configured to communicate directly using a particular protocol. Examples of out-of-band communication channels include using an image sensor to receive an image displayed by a separate device, using a microphone to receive ultrasonic chirps broadcast via a speaker of a separate device, or using an antenna to receive wireless signals broadcast on a particular frequency by a separate device. The out-of-band communication channel can be characterized as a communication channel established based on a proximity of the two devices, such as through a line of sight or within range of an audible signal or a weak wireless signal.

In some embodiments, the trusted client device 250 receives the representation of the session identifier utilizing an application 252 configured to interface with one or more sensors 254 included in the trusted client device 250. The application 252 can be a camera application configured to interface with an image sensor of the trusted client device 250. The camera application captures an image of the representation of the session identifier displayed by the host device 210 and analyzes the captured image data to decode the session identifier and/or the OTS. In other embodiments, the application 252 is an audio application configured to interface with a microphone of the trusted client device 250. The audio application records an audio clip of the representation of the session identifier and analyzes the audio clip to decode the session identifier and/or the OTS. In such embodiments, the representation of the session identifier can be implemented as an ultrasonic chirp that is produced by a speaker of the host device 210. In yet other embodiments, the application 252 is a network application configured to interface with an antenna of the trusted client device 250. The network application detects wireless signals received by the antenna and analyzes the wireless signals to decode the session identifier and/or the OTS. In such embodiments, the representation of the session identifier can be implemented as a beacon frame that is broadcast over a particular frequency by a transceiver of the host device 210. Alternatively, the representation of the session identifier can be implemented as a broadcast message transmitted to a broadcast address of a wireless network.

It will be appreciated that the application 252 and sensors 254 may vary based on the implementation of the representation of the session identifier provided by the host device 210. For example, the application 252 and sensors 254 can be configured to receive the representation as image data via image sensor(s), audio data via microphone(s), infrared data via infrared transceiver(s), wireless data via antenna(s), and so forth. In some embodiments, the host device 210 may be configured to generate and provide multiple representations of the session identifier in parallel. For example, a QR code that encodes the session identifier and/or the OTS can be presented on a display of the host device 210 and, simultaneously, an ultrasonic chirp that encodes the session identifier and/or the OTS can be played via a speaker of the host device 210. Utilization of multiple types of representations can enable the security protocol to be implemented by a broader range of trusted client devices 250, some of which may not include the means to receive certain types of representations.

In some embodiments, different types of representations can be utilized to separately encode the session identifier and the OTS. For example, the session identifier can be encoded within a QR code while the OTS can be encoded within an ultrasonic chirp. The QR code can be scanned with a camera application to decode the session identifier, which causes the trusted client device 250 to activate the microphone and record the ultrasonic chirp to decode the OTS. Using multiple out-of-band communication channels in this manner further improves the security of the user account because it is less likely another device will be able to intercept both the session identifier and the OTS.

Again, the host device 210 provides the representation of the session identifier to the trusted client device 250 without formally negotiating a connection with the trusted client device 250 using an in-band communication channel. In other words, the host device 210 can provide or otherwise make the representation of the session identifier available via one or more publishing means that do not require information about the identity of the trusted client device 250. Examples include, but are not limited to, displaying an image or video on a display, outputting audio via a speaker, outputting a signal via an infrared transceiver, outputting a wireless signal (e.g., a beacon frame) via an antenna, and so forth. In addition, the trusted client device 250 is configured to receive the representation of the session identifier and/or the OTS without configuring a connection with the host device 210 using an in-band communication channel.

In various embodiments, the trusted client device 250 includes a security framework 256. The security framework 256 is implemented as one or more processes configured to establish a protected communication session with the client application 212 in order to share credentials associated with the user account with the host device 210. The security framework 256 can be configured to calculate a shared secret key K based on the OTS decoded from the representation of the session identifier.

Once both the host device 210 and the trusted client device 250 have possession of the OTS generated by the host device 210, a shared secret key K can be calculated by both devices. In some embodiments, a PAKE protocol is utilized to exchange a shared secret key K in order to encrypt packets within the protected communication session. In the PAKE protocol, the host device 210 utilizes the OTS along with a first random number that remains private to the host device 210 to calculate a shared secret key K. The trusted client device 250 also utilizes the OTS along with a second random number that remains private to the trusted client device 250 to calculate the shared secret key K. Notably, the OTS generated by the host device 210 is shared with the trusted client device 250 over an unprotected communication channel; however, the shared secret key K is kept private and never transmitted over any communication channel. In addition, the OTS is only shared over the out-of-band communication channel, which inherently includes some measure of security. For example, intercepting the QR code would require a line-of-sight to be established with the host device 210.

In various embodiments, an augmented PAKE protocol such as a Secure Remote Password (SRP) protocol is utilized to exchange a shared secret key K in order to encrypt packets within the protected communication session. In such embodiments, the host device 210 can include the public value A within the request sent to the pairing service 284 to retrieve the session identifier. After receiving the representation of the session identifier from the host device 210, the client device 250 requests the public value A from the pairing service 284. The client device 250 calculates the public value B and transmits the public value B to the host device 210 via the pairing service 284. The host device 210 computes a confirmation (e.g., a zero-knowledge proof) and transmits the confirmation to the client device 250 via the communication channel established through the relay server 290. The client device 250 also computes a confirmation and transmits the confirmation to the host device 210 via the communication channel established through the relay server 290. A protected communication session can then be established over the communication channel between the host device 210 and the trusted client device 250 utilizing the shared secret key K to encrypt and decrypt packets transmitted over the communication channel.

It will be appreciated that, in various embodiments, different protocols can be utilized to negotiate encryption keys K to be used between the host device 210 and the trusted client device 250. For example, as described above, a Diffie-Hellman algorithm can be utilized to negotiate a shared secret key K. In different embodiments, an asymmetric cryptography algorithm can be utilized where public keys for the host device 210 and the trusted client device 250 are exchanged over the unprotected communication channel through the relay server 290 or, alternately, indirectly through the pairing service 284. The host device 210 and the trusted client device 250 also have private keys, which can be utilized in combination with the shared public keys to encrypt and decrypt data transmitted over the protected communication session.

In some embodiments, the security framework 256 is also configured to connect the trusted client device 250 to the relay server 290 using the session identifier. Consequently, the trusted client device 250 can connect, indirectly, to the host device 210 without requiring a network address of the host device 210. In various embodiments, the relay server 290 implements relay connections that forward packets from one port of a network interface to another port of the network interface. The trusted client device 250 is configured to connect to a first port of the network interface of the relay server 290, and the host device 210 is configured to connect to a second port of the network interface of the relay server 290. The relay server 290 assigns the first port and the second port to a relay connection and assigns the session identifier to the relay connection in response to the request from the pairing service 284. The relay connection causes packets arriving at the first port to be forwarded to the host device 210 on the second port and packets arriving at the second port to be forwarded to the trusted client device 250 on the first port.

The communication channel established through the relay server 290 can be protected or unprotected depending on whether packets transmitted over the communication channel are encrypted or unencrypted, respectively. The trusted client device 250 and the host device 210 can transmit packets over the communication channel in an unprotected communication session where no encryption is utilized. Alternatively, the trusted client device 250 and the host device 210 can transmit packets over the communication channel in a protected communication session using encryption. In some embodiments, the encrypted packets can also be digitally signed using a certificate that can be verified by a certificate authority. The security framework 256 can be configured to transmit public value B to the host device 210 and receive public value A from the host device 210 within an unprotected communication session. However, once the shared secret key K is known to the trusted client device 250 and the host device 210, then the security framework 256 can transition to a protected communication session using the shared secret key K to encrypt and/or decrypt data packets.

Once the protected communication session has been established between the host device 210 and the trusted client device 250, the trusted client device 250 can send the host device 210 encrypted credentials over the communication channel. In some embodiments, the trusted client device 250, via the security framework 256, collects biometric data related to the user of the trusted client device 250 utilizing the one or more sensors 254 in order to verify the identity of the user as part of the security protocol. Verifying the identity of the user may include comparing the collected biometric data with a stored profile for the user to determine if the collected biometric data matches biometric data stored in the profile. For example, fingerprint information collected by a fingerprint sensor can be compared against fingerprint information stored in the profile; an image of the user's face and, optionally, depth information collected by an image sensor and depth sensor, respectively, can be compared against facial features stored in the profile; a recording of the user's voice collected by a microphone can be compared against a recording of the user's voice stored in the profile, and so forth. Once, the user's identity has been verified by the security framework 256, a device identifier or a machine token for the trusted client device 250 can be transmitted to an identification service 286 on the server 280 to request ephemeral credentials for the service 282. The identification service 286 can compare the device identifier or machine token to stored identifiers or machine tokens associated with various user accounts in order to generate ephemeral credentials that can be used to access the user account. In various embodiments, the identification service 286 can be implemented on a different server than server 280 such that the service 282, the pairing service 284, and/or the identification service 286 are located on separate servers maintained by one or more service providers.

If the identity of the user cannot be verified by the security framework 256, then the request for the credentials is not issued to the identification service 286 and the identification service 286 does not issue credentials to access the user account to the trusted client device 250. Consequently, the host device 210 will be denied access to the user account through the service 282. However, if the identity of the user is verified by the security framework 256, and subsequently the request for the credentials is issued to the identification service 286, then the identification service 286 generates credentials to access the user account and transmits the credential to the trusted client device 250.

In some embodiments, the trusted client device 250 includes a secure enclave processor (SEP) coupled to a separate and distinct processing unit. The secure enclave processor is isolated from the processing unit and configured to generate and maintain encryption keys to perform cryptographic operations. The security framework 256 executes on the processing unit and, in response to receiving the notification from application 252, transmits a request to the SEP to verify the identity of the user. The SEP is then configured to separately verify the identity of a user of the trusted client device 250 using one or more sensors 254. For example, the SEP can request a fingerprint sensor to collect biometric information by scanning one or more fingers of the user; the SEP can request an image sensor and a depth sensor to collect biometric information by capturing an image and a depth map of a face of the user; or the SEP can request a graphical user interface to prompt a user to enter a passcode using a touch sensor of the device, or any combination thereof. The SEP compares the biometric information and/or passcode to profile data stored in a secure non-volatile memory associated with the SEP. In some embodiments, the profile data is encrypted using a private key stored within the SEP (e.g., in a ROM) such that only the SEP can access the private key.

Once the SEP has confirmed the identity of the user of the trusted client device 250, the SEP transmits a response to the security framework 256 that indicates the user's identity has been verified, and the security framework then sends a request to the identification service 286 that includes a device identifier or machine token for the trusted client device 250. However, if the SEP cannot confirm the identity of the user of the trusted client device 250, then the SEP transmits a response to the security framework 256 that indicates the identity was not confirmed, and the security framework 256 does not send the request to the identification service 286.

In some embodiments, a response received from the identification service 286 includes credentials that comprise ephemeral credentials that permit the host device 210 to access the user account for a period of time. The ephemeral credentials can also be referred to as a password equivalent token (PET) that can be used in place of conventional credentials such as a username and password. The identification service 286 can associate the ephemeral credentials with a user account within a data structure maintained by the server 280. In some embodiments, the identification service 286 registers the device identifier or machine token with a particular user account for a service in a data structure maintained by the server 280. For example, a user that logs onto the user account via the service 282, using the trusted client device 250, can choose to register the device identifier or machine token for the trusted client device 250 with the identification service 286 after providing conventional credentials to log in to the user account via the service 282. By registering the trusted client device 250 as being associated with a particular user account, the identification service 286 can then enable the host device 210 to log in to the user account via the service 282 using the trusted client device 250 to provide a password equivalent token to the host device 210 instead of using the conventional credentials.

In some embodiments, the trusted client device 250 encrypts the ephemeral credential using the shared private key K and transmits the ephemeral credential to the host device 210 over the communication channel established through the relay server 290 within the protected communication session.

The host device 210 can decrypt the ephemeral credentials and then utilize the ephemeral credentials to sign in to the user account through the service 282. The communication channel can be closed and the user can then utilize the service 282 with access to the user account. In some embodiments, the communication channel can remain open such that the host device 210 and the trusted client device 250 can communicate via the protected communication session while the host device 210 is connected to the service 282. The trusted client device 250 can then interact with the service 282 via the host device 210.

For example, the host device 210 could download programming guide data from the service 282 and transmit the programming guide data to the trusted client device 250 within the protected communication session to utilize the trusted client device 250 as a remote for the host device 210. Selections made by the user via the trusted client device 250 can then be transmitted to the host device 210 within the protected communication session and utilized to control the operation of the host device 210, such as directing the host device 210 to download and display a particular program.

As another example, the host device 210 can be utilized to access sensitive data stored in a remote data store by a service and encrypted using a split-key concept. More particularly, data can be encrypted with an encryption key stored on the trusted client device 250 and uploaded to the remote data store. The encryption key is then split into multiple key portions, such that decryption of the encrypted data can be performed by sequential decryption using the multiple key portions. The trusted client device 250 can transmit one key portion of the multiple key portions to the host device 210 via the protected communication session. The other key portions of the multiple key portions are then transmitted to one or more intermediate servers or intermediate devices that are distinct from the host device 210. The host device 210 does not possess all portions of the encryption key and, therefore, cannot decrypt the encrypted data directly from the remote data store. Instead, the host device 210 requests the encrypted data from the one or more intermediate servers or intermediate devices, which decrypt the encrypted data using corresponding key portions provided to each of the one or more intermediate servers or intermediate devices. The host device 210 can only decrypt the encrypted data using the final key portion provided to the host device 210 once the encrypted data has been decrypted using all other key portions. This technique can be used to protect information that may need enhanced security measures, such as personal information like financial data or health data.

In some embodiments, the host device 210 includes one or more sensors 214 that can be utilized to collect biometric data. Once a user has logged onto the service 282 utilizing the trusted client device 250 to exchange the PET, the user may subsequently re-connect with the service 282 (e.g., log on) by utilizing the one or more sensors 214 of the host device 210 to confirm the identity of the user. In some embodiments, biometric data for an individual can be collected by the sensors 214 and transmitted to the trusted client device 210 via the protected communication session to confirm the identity of the user with the security framework 256. If the identity of the user is confirmed, then the previous PET can be utilized to sign into the service 282. Alternatively, the trusted client device 250 can request a new PET from the identification service 286, and the new PET can be provided to the host device 210 via the protected communication session.

Figure 3A:
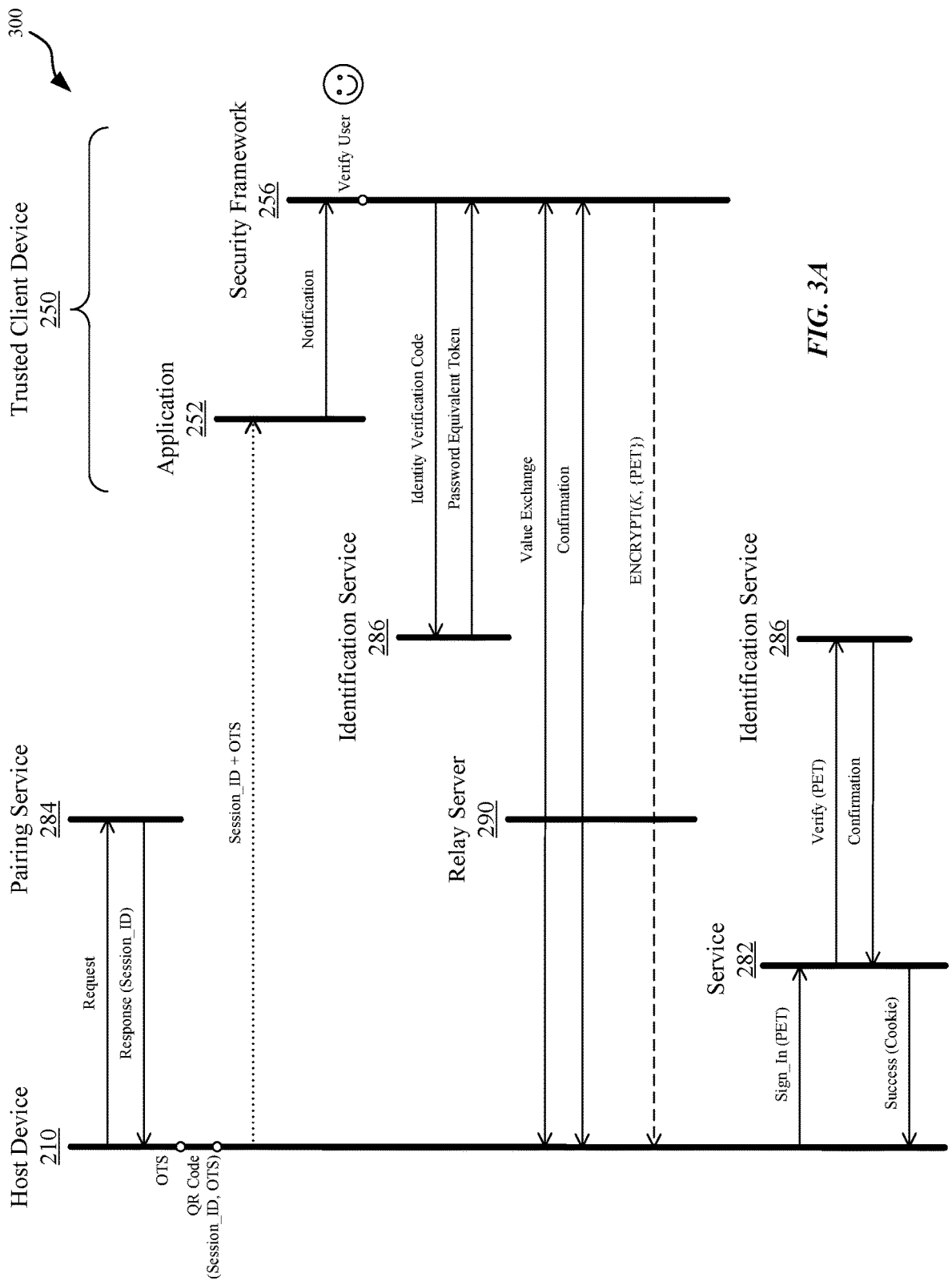
FIG. 3A is a conceptual diagram of a security protocol implemented by the various components of the system of FIG. 2, in accordance with some embodiments.

FIG. 3A is a conceptual diagram of a security protocol 300 implemented by the various components of the system 200 of FIG. 2, in accordance with some embodiments. Although the security protocol 300 is described with reference to the components of system 200, it will be appreciated that the security protocol 300 is not limited to the specific implementation utilizing the components of system 200.

The security protocol 300 begins by having a host device 210 transmit a request for a session identifier to a pairing service 284 on a server 280. The session identifier, retrieved by the pairing service 284 from the relay server 290, is transmitted by the pairing service 284 to the host device 210 in a response to the request. The host device 210 also generates an OTS, which can be performed by the host device 210: (1) subsequent to receiving the response including the session identifier from the pairing service 284; (2) prior to transmitting the request for the session identifier to the pairing service 284; or (3) subsequent to transmitting the request for the session identifier to the pairing service 284 but prior to receiving the response including the session identifier from the pairing service 284.

Once the host device 210 has received the session identifier and has generated the OTS, the host device 210 generates a representation of the session identifier, which can include the generation of a QR code that encodes a URL with the session identifier and the OTS included therein. Alternatively, the host device 210 can generate separate representations for the session identifier and the OTS. The host device 210 provides the representation to an application 252 of a trusted client device 250 via an out-of-band communication channel. In some embodiments, the host device 210 can prompt a user to manually configure the application 252 on the trusted client device 250 to receive the representation (e.g., open the application 252 and point a camera of the trusted client device 250 at a display).

The trusted client device 250, via the application 252, decodes the QR code to determine the session identifier and the OTS. The application 252 transmits a notification to the security framework 256, which includes the session identifier and the OTS. The security framework 256 verifies an identity of a user of the trusted client device 250, and, if the identity is verified, transmits a request to the identification service 286 to request ephemeral credentials that can be used by the host device 210 to log in to the user account via the service 282. The identification service 286 generates ephemeral credentials (e.g., a PET or password equivalent token) for the user account. The identification service 286 then transmits the ephemeral credentials back to the security framework 256 of the trusted client device 250.

The trusted client device 250 then exchanges values with the host device 210 as part of a protocol to negotiate a shared secret key K. The public values A and B are exchanged over a communication channel within an unprotected communication session utilizing the relay server 290. As a part of some protocols (e.g., SRP), the host device 210 and the trusted client device 250 exchange confirmations that prove that the host device 210 and the trusted client device 250 have calculated the same shared secret key K. The confirmations can comprise exchange of information that establishes a zero-knowledge proof that the host device 210 and the trusted client device 250 have correctly calculated the same value for the shared secret key K.

The connection between the trusted client device 250 and the relay server 290 can be established using the session identifier. Similarly, the connection between the host device 210 and the relay server 290 can also be established using the session identifier. The host device 210 and the trusted client device 250 both calculate a shared secret key K, which is utilized to establish a protected communication session over the communication channel via the relay server 290. The trusted client device 250, via the security framework 256, encodes the ephemeral credentials using the shared secret key K and transmits the encoded ephemeral credentials to the host device 210 using the protected communication channel. The host device 210 decrypts the ephemeral credentials and utilizes the ephemeral credentials to access the user account through the service 282.

In some embodiments, the service 282 receives the PET from the host device 210 and then transmits a request to verify the PET to the identification service 286. The identification service 286 has previously registered the user account for the service 282 with the trusted client device 250, such that the identification service 286 can confirm whether the PET provided by the service 282 is in fact associated with the particular user account registered with the identification service 286. The confirmation can include an identifier for a user account associated with the service 282 or, alternatively, conventional credentials (e.g., a username and a password) to sign in to a particular user account.

In other embodiments, the service 282 and the identification service 286 are managed by the same service provider such that the PET, as generated by the identification service 286 is associated with a particular user account at the time of generation. In such embodiments, the service 282 simply correlates the PET received from the host device 210 with a particular user account by querying the identification service 286 with the PET. The identification service 286 simply returns an indication of whether access to a particular user account is authorized under the PET to the service 282. In some embodiments, the service 282 and the identification service 286 are combined as a single service implemented on one or more servers.

In some embodiments, the service 282 transmits a cookie to the host device 210 that indicates the host device 210 has signed into the user account successfully. The cookie can enable the user to sign in to the user account from the host device 210 for a duration of time, without using the trusted client device 250 or providing conventional credentials, such as by signing into the account automatically using the stored PET or requiring a user of the host device 210 to provide biometric information utilizing sensors 214 before using the PET to sign in to the user account.

In some embodiments, the security protocol 300 includes an optional step when a particular host device 210 is connecting to the user account for the first time, which can be established via cookies stored on the host device 210. In such embodiments, the service 282 can prompt the user to enter a verification code transmitted to the trusted client device 250 after the user has signed in to the user account using the ephemeral credentials. The verification code can be, e.g., a 6-digit numeric code. The user is prompted to enter the verification code utilizing an input device of the host device 210. Alternatively, the verification code can be an n-digit alphanumeric code or any other type of code that can be manually input by the user at the host device 210. Once the verification code has been provided at the host device 210, this step of the security protocol 300 can be omitted when using this particular host device 210 to access the user account in subsequent browser sessions.

Figure 3B:
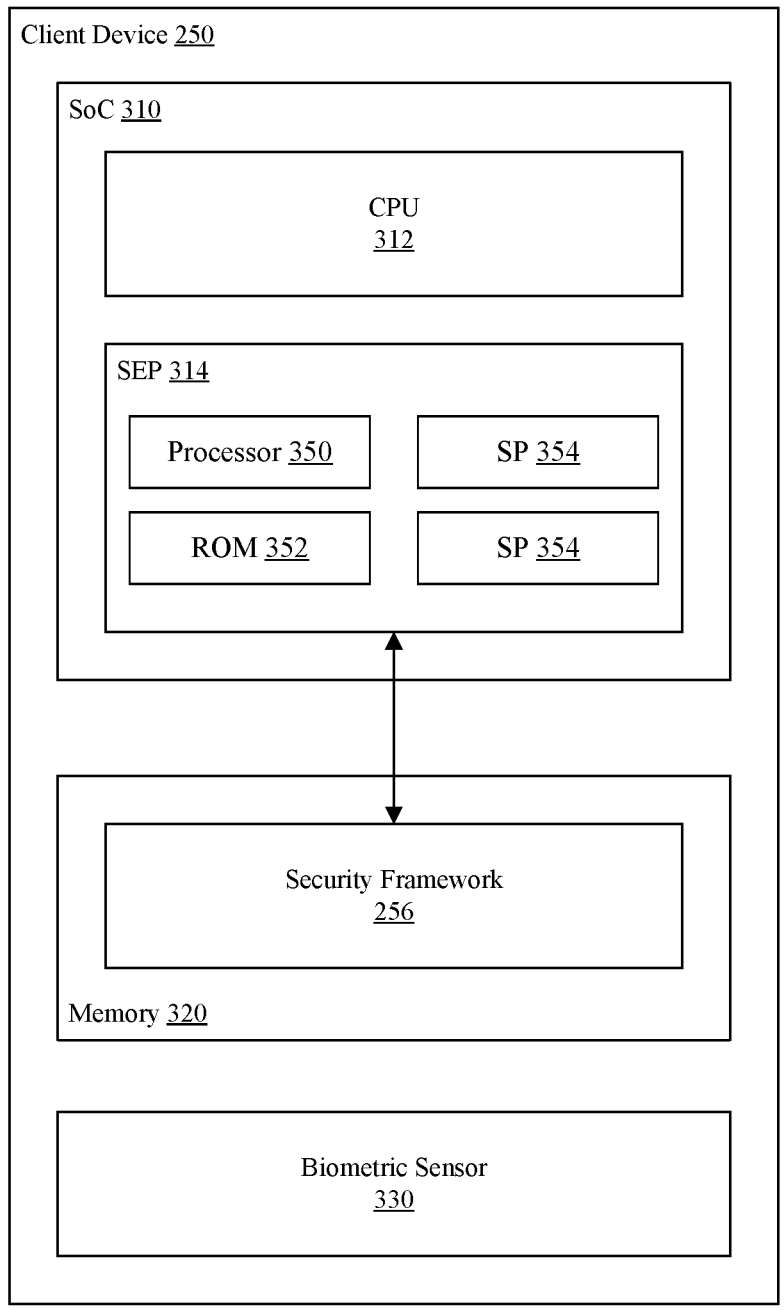
FIG. 3B illustrates a trusted client device that utilizes a secure enclave processor to implement a private key infrastructure, in accordance with some embodiments.

FIG. 3B illustrates a trusted client device 250 that utilizes a SEP 314 to implement a private key infrastructure (PKI), in accordance with some embodiments. As shown in FIG. 3B, the trusted client device 250 includes a system-on-a-chip (SoC) 310, a memory 320, and a biometric sensor 330. The SoC 310 is an integrated circuit that includes a number of components including a central processing unit (CPU) 312 and a SEP 314. The SEP 314 is a secure circuit that generates and maintains public and private keys utilized to perform cryptographic operations requested by other units (e.g., CPU 312) of the SoC 310. The CPU 312 executes instructions implemented as various software stored in the memory 320. The memory 320 includes the software framework 256. Although not shown, the memory 320 can also include an operating system and the application 252.

In some embodiments, the security framework 256 utilizes the SEP 314 to verify the identity of a user using the biometric sensor 330. Again, the biometric sensor 330 can be a fingerprint sensor configured to collect biometric data that comprises fingerprint information provided by a user by placing one or more fingers on the fingerprint sensor. In other embodiments, the biometric sensor 330 includes at least an image sensor and a depth sensor configured to collect biometric information that comprises an image of a user's face and a depth map associated with the image, respectively. In some embodiments, communications between SEP 314 and biometric sensor 330 can be encrypted using a key shared between SEP 314 and the biometric sensor 330 such that another circuit (e.g., CPU 312) is unable to view communicated biometric data.

In some embodiments, the security framework 256, executing on the CPU 312 receives a notification from the application 252 and initiates a procedure to confirm the identity of a user using the SEP 314. The security framework 256 can implement an API, called by the application 252, that causes the security framework 256 to request identity confirmation by the SEP 314 utilizing the biometric sensor 330. Upon receiving the request from the security framework 256, the SEP 314 requests biometric data from the biometric sensor 330. In some embodiments, the biometric data collected by the biometric sensor 330 is encrypted and stored in a secure memory allocated to the SEP 314. The SEP 314 can then decrypt the biometric data and compare the collected biometric data against stored biometric data for a user of the trusted client device 250. If the collected biometric data matches the stored biometric data, then the identity is confirmed and the SEP 314 returns a response to the security framework 256 that the identity of the user has been confirmed. Otherwise, the SEP 314 returns a response to the security framework 256 that the identity of the user has not been confirmed.

In some embodiments, the SEP 314 includes one or more processors 350, a secure read-only memory (ROM) 352, and one or more security peripherals 354. Processor 350 can execute securely loaded software. For example, the secure ROM 352 can include software executed by the processor 350. One or more of the security peripherals 354 can include an external interface, which can be connected to a source of software (e.g., ROM 352 or memory 320). In some embodiments, the software can be encrypted and loaded into a secure portion of memory 320 allocated to the SEP 314. A memory controller for the SoC 310 can prevent units other than the SEP 314 (e.g., CPU 312) from accessing this secure portion of memory 320. Although software stored in the secure portion of memory 320 is more secure than software stored in other portions of memory 320, the secure software can still be prevented from directly accessing/obtaining stored private keys, which are stored in hardware, such as in secure ROM 352 only accessible within the SEP 314. In other embodiments, the processor 350 may be omitted from the SEP 314, which implements all functions in various security peripherals 354.

The SEP 314 is isolated from other components of the SoC 310 except for a carefully controlled interface. In some embodiments, the security framework 256, via the CPU 312, communicates with the SEP 314 through a secure mailbox mechanism implemented as part of the interface. Through the secure mailbox mechanism, external components of the SoC 310 transmit messages to an inbox, where SEP 314 can read and interpret the messages, and determine what actions, if any, to take in response to the message. Response messages from the SEP 314 are transmitted back to the external components of the SoC 310 through an outbox. It will be appreciated that software outside of the SEP 314 is prevented from directly accessing any internal components of SEP 314.

Security peripherals 354 can refer to hardware configured to assist in various services performed by SEP 314. As will be described in more detail with respect to FIG. 3C, security peripherals can include authentication hardware that implement various authentication algorithms, encryption hardware that implement various encryption algorithms, secure interface controllers, and the like.

Figure 3C:
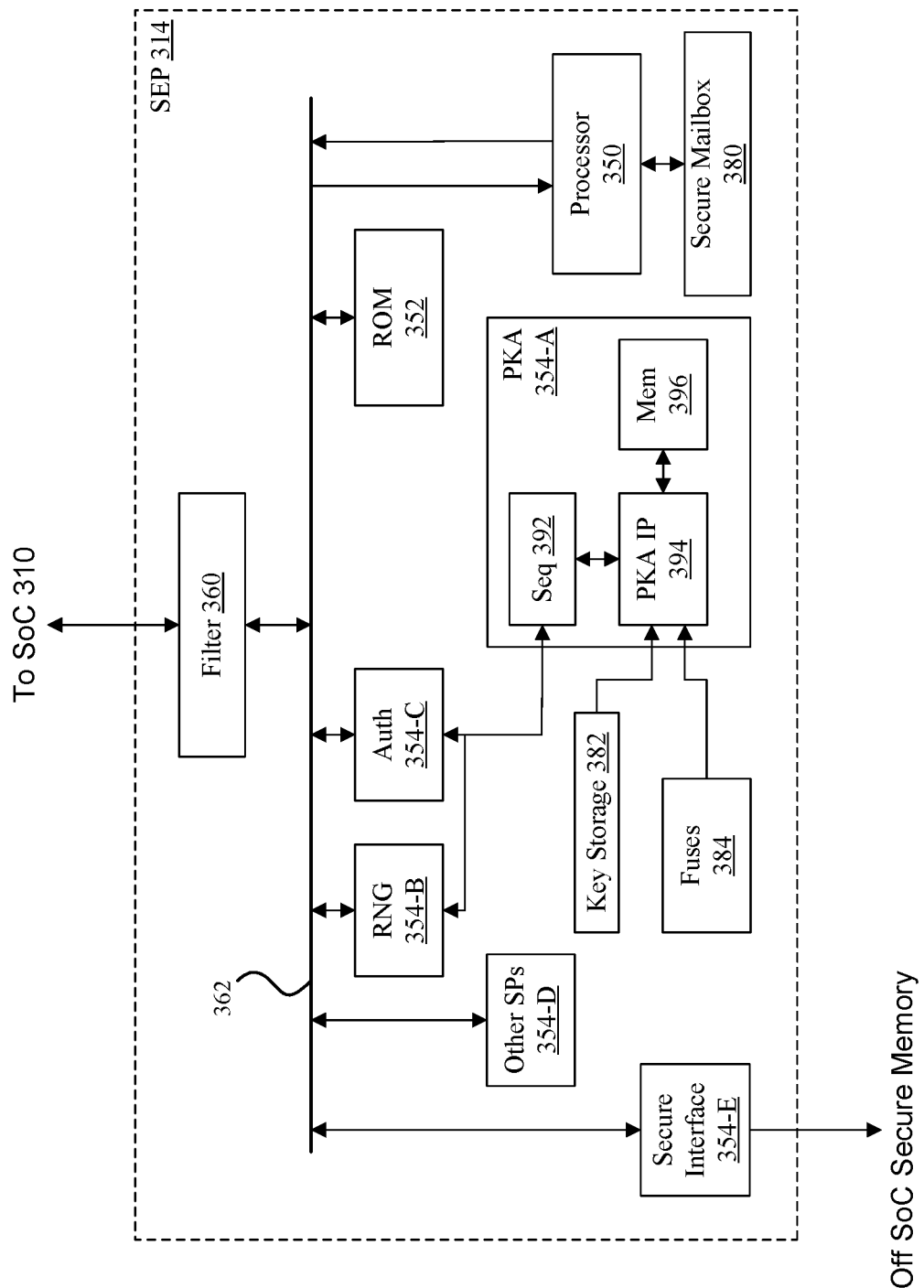
FIG. 3C is a block diagram of the secure enclave processor, in accordance with some embodiments.

FIG. 3C is a block diagram of the SEP 314, in accordance with some embodiments. SEP 314 includes the processor 350, secure ROM 352, and security peripherals 354-A-354-E, filter 360, secure mailbox 380, key storage 382, and fuses 384. Filter 360 can be coupled to a communication fabric of SoC 310 to enable communications with other components of the SoC 310, such as CPU 312. The filter 360 can also be coupled to a local interconnect 362 to which other components of SEP 314 are also coupled.

Security peripheral 354-A is a public key accelerator (PKA), which includes a sequencer 392, a PKA intellectual property (IP) circuit 394, and a PKA memory 396. Sequencer 392 is coupled to interconnect 362, security peripherals 354-B and 354-C, and PKA IP circuit 394. PKA IP circuit 394 is configured to receive private keys from key storage 382 and/or fuses 384. Processor is coupled to secure mailbox 380.

Filter 360 is configured to tightly control access to SEP 314 to increase isolation of SEP 314. For example, filter 360 can permit read/write access requests addressed to SEP 314 only if such read/write access requests address the secure mailbox 380. Any other operations can be isolated from the interconnect 362 such that external components of the SoC 310 cannot access, e.g., PKA 354-A, ROM 352, and so forth. In some embodiments, the filter 360 only filters incoming read/write requests, thereby allowing any components of the SEP 314 to access external components of the SoC 310 through the interface coupled to the filter 360.

Secure mailbox 380 includes an inbox and an outbox, which can be implemented, in some embodiments, as first-in first-out (FIFO) buffers configured to store data. The buffers can have a size sufficient to store a number of messages and corresponding responses. Secure ROM 352 is coupled to local interconnect 362 and is configured to respond to read requests addressed to a range of addresses assigned to secure ROM 352. In some embodiments, processor 350 can be configured to load program instructions from secure ROM 352 on boot. The program instructions can be configured to process inbox messages received through secure mailbox 380 and generate outbox messages through secure mailbox 380. The program instructions can also include code to interface with the various security peripherals 354-A-354-E. The program instructions can include code for generating keys, managing keys, generating certificate signing requests, performing authentication algorithms, and the like.

In some embodiments, inbox messages can include commands that involve private keys, which causes processor 350 to provide commands to PKA 354-A and, more particularly, to sequencer 392, which includes circuitry to decode the commands and process the commands. The sequencer 392 can control the PKA IP circuit 394 to manipulate private keys maintained by the SEP 314. Private keys are stored in the key storage 382, which can be a non-volatile memory that stores private keys generated by SEP 314. In some embodiments, the private keys can be encoded using external information—such as biometric information, a passcode, or a password associated with an external application—and can be wrapped with an access control list that indicates usages criteria for each of the private keys. Fuses 384 can contain one or more private keys that are created during fabrication of SEP 314 and cannot be re-written, that is a private key in fuses 384 can be written by burning out specific fuses in fuses 384. In some embodiments, at least one of the private keys in fuses 384 is a unique identity (UID) key stored by a manufacturer of SEP 314. This UID can be used to sign certificate signing requests. PKA IP circuit 394 can generate intermediate results, which are written to memory 396. In some embodiments, memory 396 can include a ROM storing command sequences for performing various operations within PKA IP circuit 394. In some cases, memory 396 can store private keys or values derived from private keys in key storage 382 or fuses 384. The PKA IP circuit 394 can be implemented to perform a number of operations, including, e.g., public key extraction, digital signature generation, digital hashing, encryption, and decryption.

In some embodiments, an authentication circuit 354-C implements an authentication algorithm. The authentication algorithm can implement a secure hash algorithm (SHA) such as SHA-2 or any other authentication algorithm. In some embodiments, a random number generator (RNG) 354-B includes circuitry for generating a random or pseudo-random number. In addition, there may be various other security peripheral(s) 354-D. At least one security peripheral 354-E can be designed to implement secure interfaces. For example, the security peripheral 354-E can be an interface to memory 320 and, more particularly, to a secure portion of memory 320.

Each security peripheral 354 can include a programming interface that can be accessed by processor 350 to invoke operations utilizing the security peripherals 354. For example, a security peripheral 354 can include one or more registers that can be programmed by instructions executed by processor 350.

In some embodiments, the security framework 256 transmits a request to verify an identity of a user of the trusted client device 250 to the inbox of the secure mailbox 380. The processor 350 processes the request and, via a key manager program stored in the secure ROM 352 and executed by the processor 350 transmits a command to access a private key to the PKA 354-A. The PKA IP circuit 394 can consult an access list for the private key and, determine that the access list requires information from a biometric sensor 330 to decrypt the private key stored in the key storage 382. The PKA IP circuit 394 causes the biometric sensor 330, via the secure interface 354-E, to collect biometric data, which can then be read from the secure portion of the memory 320 and analyzed by the key manager program within the processor 350. In some embodiments, the biometric data can include image data and/or a depth map. In other embodiments, the biometric data can include fingerprint data. In yet other embodiments, the access control lists can also require the user to enter a pass code in addition to providing biometric data, which can both be utilized by the key manager in the analysis to confirm the identity of the user. If the identity is verified, then an indication that the identity is confirmed can be written to the outbox of the secure mailbox 380, which can be read by the security framework 256. Otherwise, the indication can indicate the identity of the user was not confirmed.

In some embodiments, additional details related to the SEP 314 are described as set forth in U.S. patent application Ser. No. 15/173,647, entitled "SECURE CIRCUIT FOR ENCRYPTION KEY GENERATION," filed on Jun. 4, 2016, the content of which is incorporated herein by reference in its entirety for all purposes.

FIGS. 4A-4F illustrate a user interface associated with the security protocol 300, in accordance with some embodiments. The user interface can be generated by the service 282 and provided to the host device 210 to display to a user. The user interface prompts the user to take various steps to complete the security protocol 300, such as configuring the trusted client device 250 to receive the representation of the session identifier and/or OTS via the out-of-band communication channel.

In some embodiments, the user interface is implemented as a number of web pages that are displayed in a browser application. Each view of the user interface can refer to a distinct HTML document including a number of HTML elements and/or scripts. Alternatively, each view can refer to different configurations of a single HTML document as modified by one or more scripts in response to actions or user input.

Figure 4A:
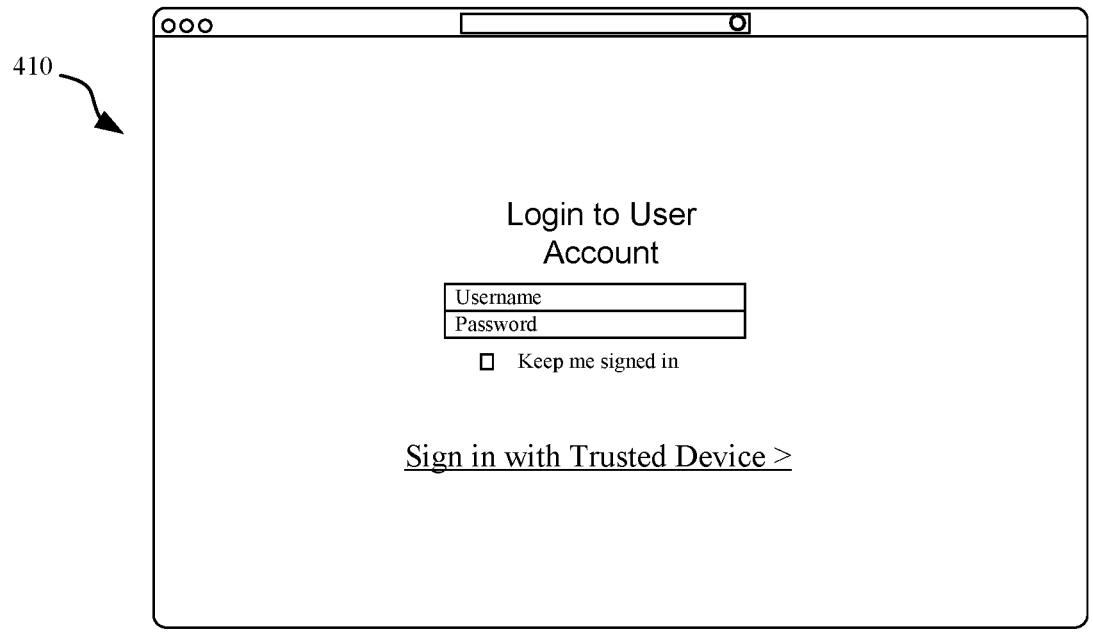
FIGS. 4A-4F illustrate a user interface associated with the security protocol, in accordance with some embodiments.

As shown in FIG. 4A, the user interface includes a first view 410 displayed within a window of the browser application. The first view 410 includes a number of user interface elements related to signing in to a user account via a service accessible over a network. The first view 410 prompts a user to login to a user account. The first view 410 also includes a first text field to input a username associated with the user account and a second text field to input a password associated with the user account. A separate user interface element is included to select an option to keep the user signed in across separate browser sessions. Finally, a link at the bottom of the first view 410 enables a user to select an option to sign in to the user account with a trusted client device 250. Selecting this option enables a user to bypass manually entering in credentials using the first text field and the second text field in order to sign in to the user account. Selecting the link can cause the browser application to request a new view of the user interface from the server 280 that implements the service 282.

Figure 4B:
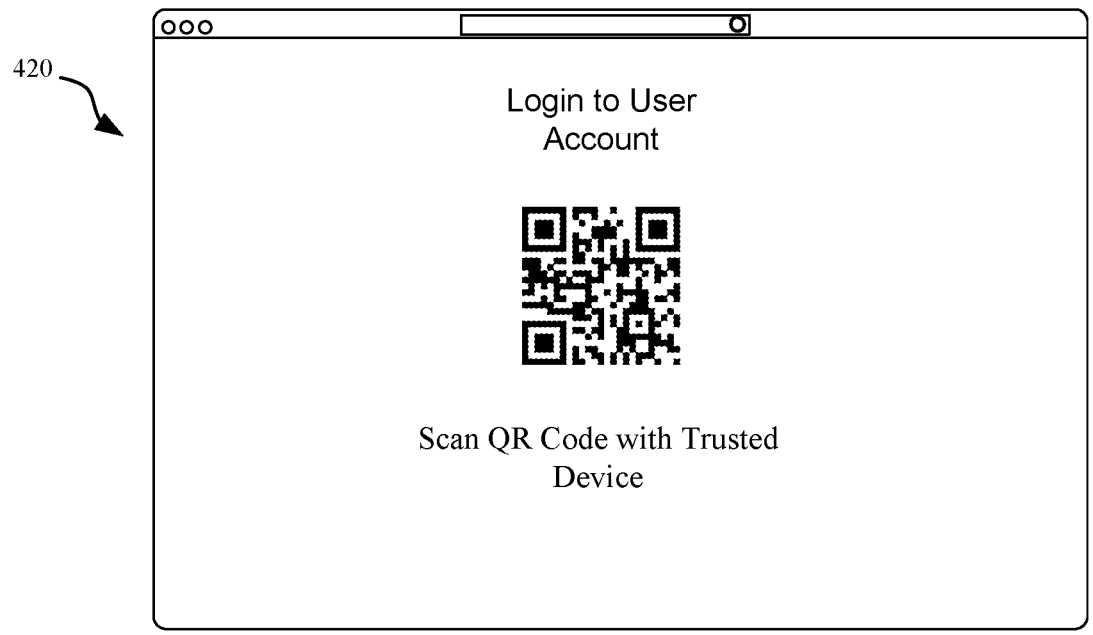

As shown in FIG. 4B, the user interface includes a second view 420 displayed within a window of the browser application. The second view 420 includes a prompt for the user to scan a QR code with a trusted client device. In some embodiments, the second view 420 includes a script that causes the browser application to transmit a request to a pairing service 284 to retrieve a session identifier to use to establish a communication session between the host device 210 and the trusted client device 250. The second view 420 also includes a script to generate the OTS. Finally, the second view 420 includes a script to encode the session identifier and the OTS within a representation of the session identifier, which, in this case, is implemented as a QR code. It will be appreciated that the scripts included in the second view 420 can include code for performing the actions described herein directly or, alternatively, the script can include code for performing the actions indirectly by calling a remote method, such as by calling a function implemented by a service accessible over the network using a specific URL.

A user will use the trusted client device 250 to scan the QR code. In some embodiments, a camera application in the trusted client device 250 is configured to recognize that a QR code is included within an image captured by the image sensor, decode the information encoded within the QR code, and perform some action based on the information. In some embodiments, the session identifier is included within a URL encoded within the QR code, and the camera application is configured to utilize a browser application on the trusted client device 250 to transmit an HTTP request based on the URL. The URL can be configured to direct the HTTP request to the server 280, which triggers the service 282 to: (1) update the view within the user interface displayed on the host device; and (2) trigger the trusted client device 250 to confirm the user's identity via one or more techniques described above.

Figure 4C:
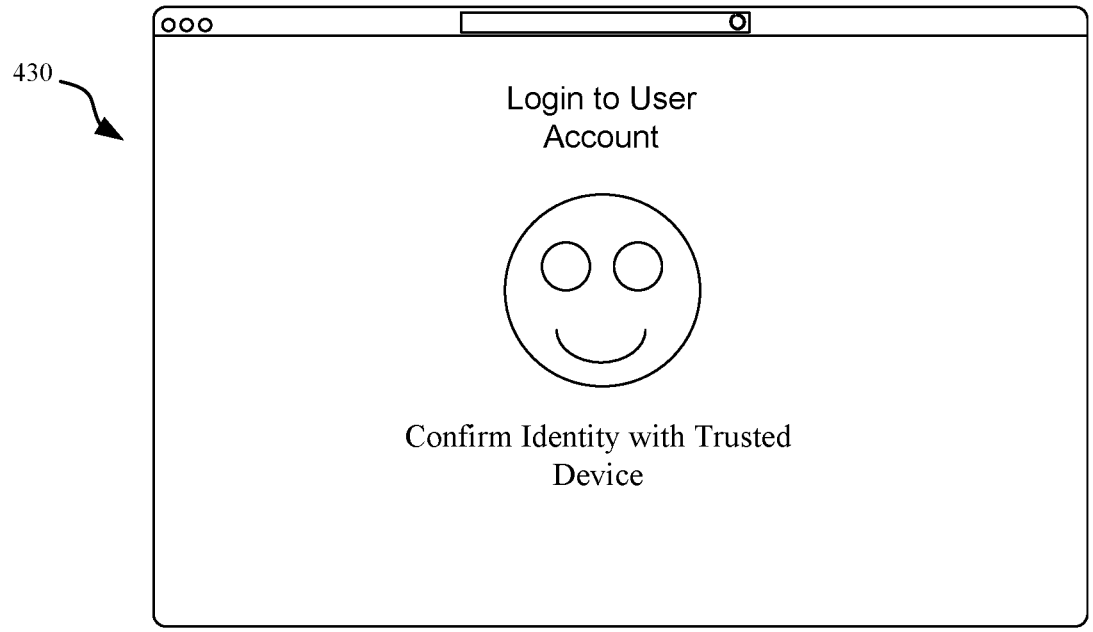

As shown in FIG. 4C, the user interface includes a third view 430 displayed within a window of the browser application. The third view 430 simply prompts the user to confirm the user's identity with the trusted client device 250. At the same time, a user interface on the trusted client device 250 can also prompt the user to confirm the user's identity, such as by activating an application associated with the security framework 256. The user will then confirm their identity by, for example: (1) pointing a camera and/or depth sensor of the trusted client device 250 at the user's face, (2) scanning a finger with a fingerprint sensor, and/or (3) repeating a short phrase into the microphone of the trusted client device 250. After the user performs the desired action, the biometric data collected by the one or more sensors 254 is compared to a known profile of the user to confirm the identity of the user.

Figure 4D:
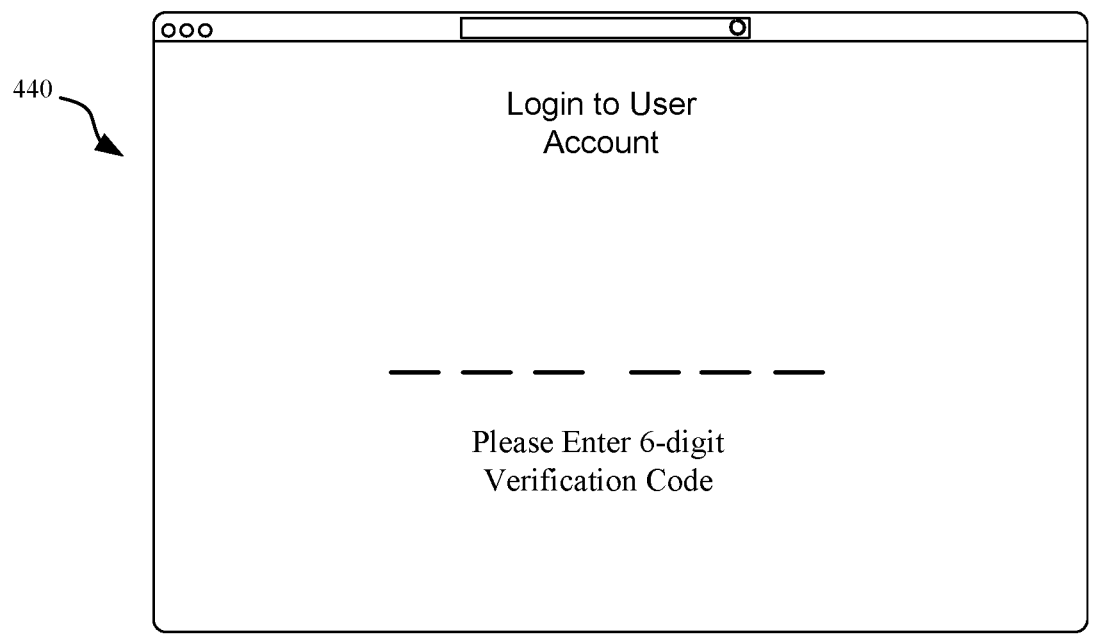

As shown in FIG. 4D, the user interface includes a fourth view 440 displayed within a window of the browser application. In some embodiments, the fourth view 440 is optional and prompts a user to enter a verification code that was transmitted to a phone number associated with the owner of the user account in response to attempting to sign in using the ephemeral credentials. Entry of a valid verification code can cause the fourth view 440 to transition to the fifth view 450. For example, the verification code can be transmitted to a user's mobile phone, which may be different than or the same as the trusted client device 250.

Figure 4E:
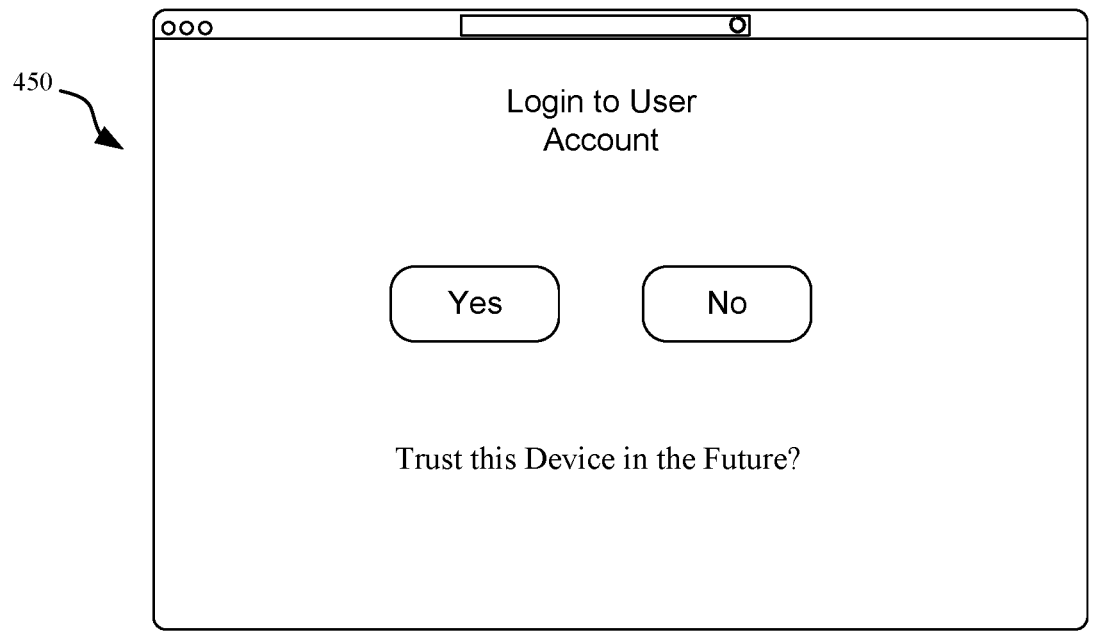

As shown in FIG. 4E, the user interface includes a fifth view 450 displayed within a window of the browser application. In some embodiments, the fifth view 450 is optional and prompts a user to select whether the host device 210 should be trusted in the future. In such embodiments, the security protocol 300 can change operation between a cold start mode and a warm start mode. In the cold start mode, the host device 210 is completely unknown and, therefore, the user may be prompted to enter a verification code at the host device 210 that is received on the trusted client device 250 after the user has attempted to sign in using the ephemeral credentials. The cold start mode may be appropriate when the user is attempting to access a user account from a public device that is shared with an unknown number of users. In warm start mode, the host device 210 has previously been utilized to sign in to the user account and, therefore, the step of entering the verification code can be skipped in the future. The warm start mode may be appropriate when the host device 210 is frequently used by the user or people known to the user (e.g., family) but is not a device the user wishes to associate with the user account as a trusted client device. Possible examples of devices for which the warm start mode may be appropriate is a work laptop, which is frequently used by a user but is not owned by the user, or a device shared by the family The fifth view 450 includes a first user interface element that enables, when selected, the warm start mode to be used by the host device 210 in the future and a second user interface element that requires, when selected, the cold start mode to be used by the host device 210 in the future. The selected option can be stored as an option in meta data associated with the user account. Alternatively, the selected option can be stored on the host device 210 using a browser cookie.

Figure 4F:
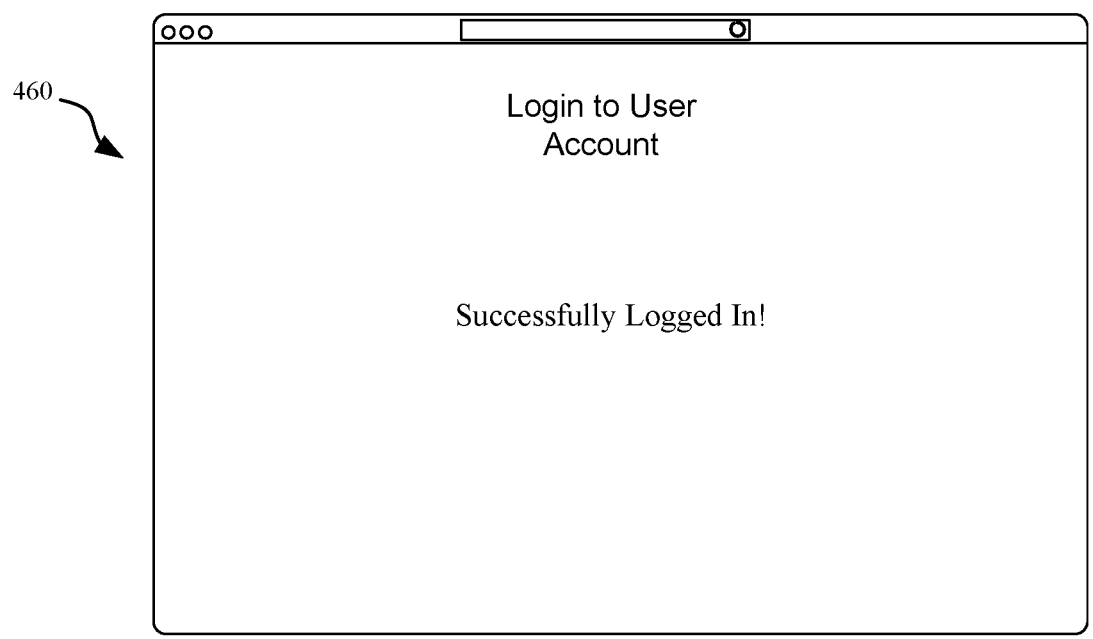

As shown in FIG. 4F, the user interface includes a sixth view 460 displayed within a window of the browser application. The sixth view 460 simply confirms that the user is logged in to the user account. It will be appreciated that the sixth view 460 may be replaced by another view related to the main user interface of the service 282 once sign in is complete.

Figure 5:
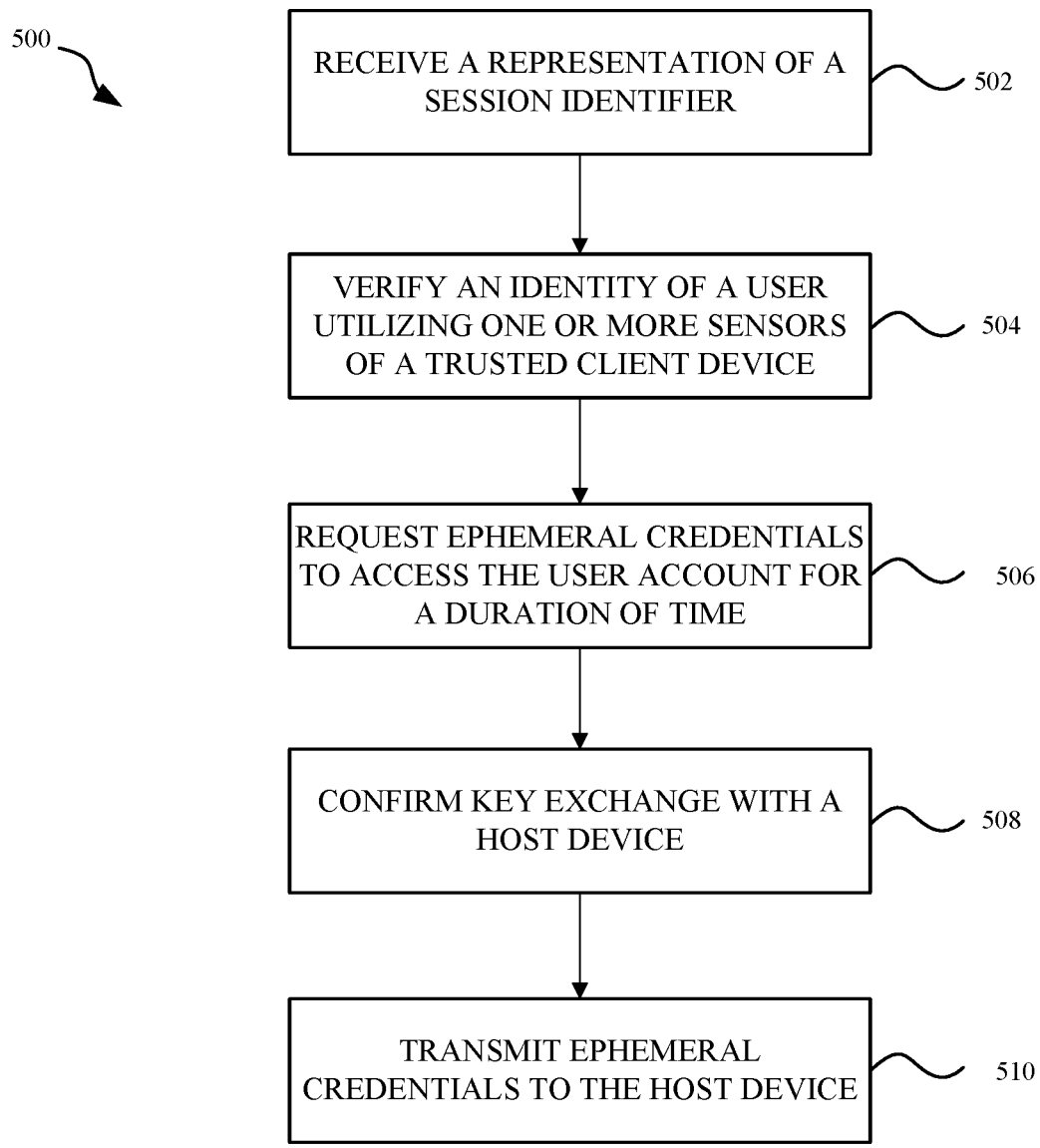
FIG. 5 illustrates a flowchart of an exemplary method for implementing a security protocol utilizing a trusted client device, in accordance with some embodiments.

FIG. 5 illustrates a flowchart of an exemplary method 500 for implementing a security protocol utilizing a trusted client device, in accordance with some embodiments. The method 500 can be performed by hardware, software executed by a processor, or any combination of hardware and software. In some embodiments, the method 500 can be implemented, at least in part, by the trusted client device 250.

At step 502, a trusted client device receives a representation of a session identifier. In some embodiments, the representation encodes a session identifier and an OTS that can be utilized by the trusted client device to establish a protected communication session with a host device.

At step 504, a trusted client device verifies an identity of a user utilizing one or more sensors of the trusted client device. In some embodiments, the identity of the user is verified using a fingerprint sensor. In other embodiments, the identity of the user is verified using an image sensor, depth sensor, and/or a microphone. In various embodiments, multiple techniques may be combined to provide a more robust identity verification technique, such as by combining facial recognition with voice recognition and/or a fingerprint scan.

At step 506, a trusted client device requests ephemeral credentials to access the user account for a duration of time. The trusted client device can request the ephemeral credentials from a service provider. In some embodiments, the request may include proof of the user's identity.

At step 508, the trusted client device confirms key exchange with the host device. In some embodiments, the trusted client device establishes an unprotected communication session with the host device via a relay server using the session identifier. A public value calculated by the trusted client device, based on the OTS and a private random number generated by the trusted client device, is sent to the host device. The trusted client device also receives a public value calculated by the host device, based on the OTS and a private random number generated by the host device.

At step 510, the trusted client device transmits the ephemeral credentials to the host device. In some embodiments, the trusted client device establishes a protected communication session with the host device via the relay server using the session identifier. The ephemeral credentials are encrypted with a shared secret key K and transmitted within the protected communication session.

Figure 6:
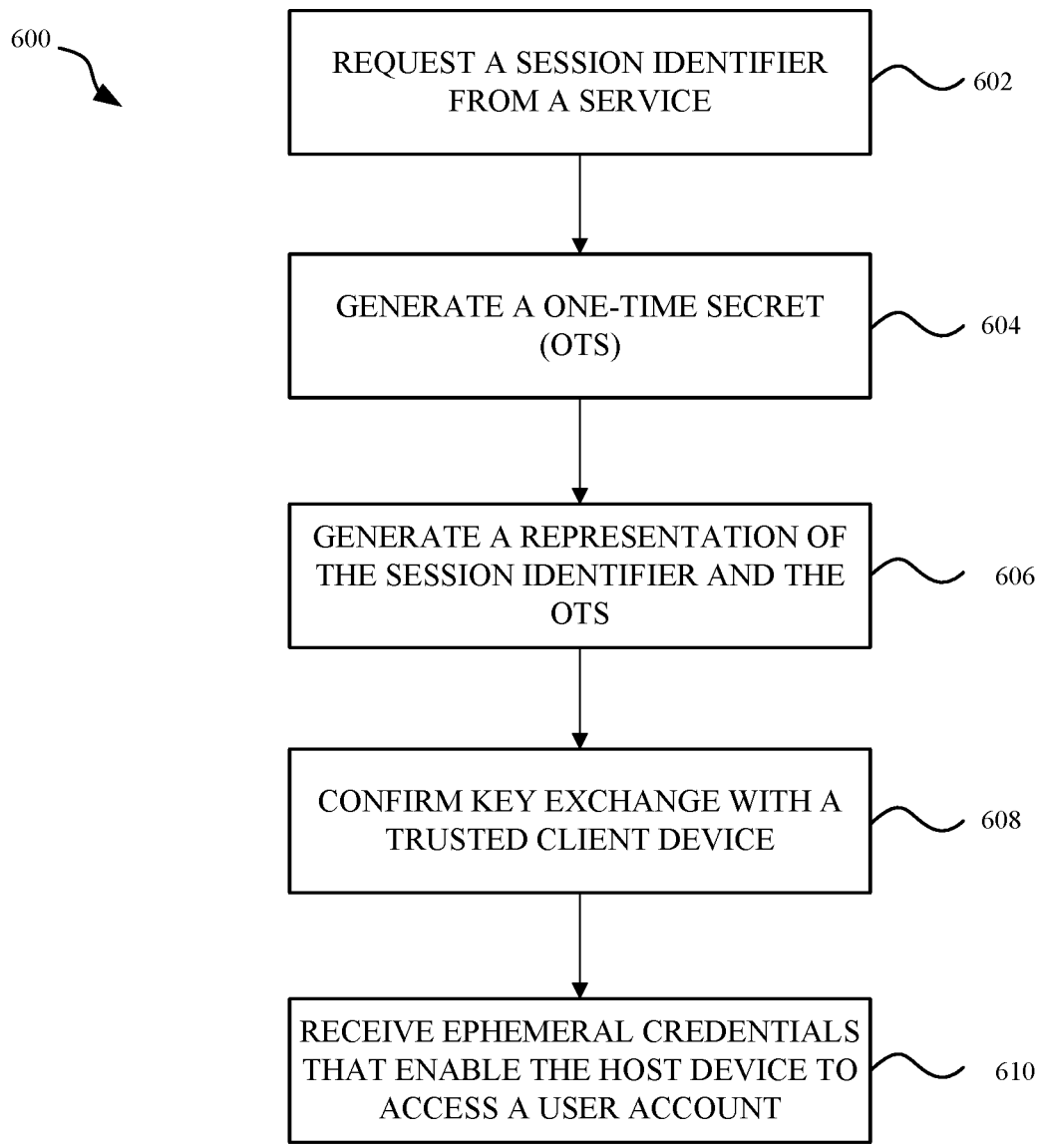
FIG. 6 illustrates a flowchart of an exemplary method for implementing a security protocol utilizing a trusted client device, in accordance with some embodiments.

FIG. 6 illustrates a flowchart of an exemplary method 600 for implementing a security protocol utilizing a trusted client device, in accordance with some embodiments. The method 600 can be performed by hardware, software executed by a processor, or any combination of hardware and software. In some embodiments, the method 600 can be implemented, at least in part, by the host device 210.

At step 602, a host device requests a session identifier from a service. In some embodiments, the session identifier enables the host device to communicate with a trusted client device via a relay server. The service can be a pairing service associated with the relay server. In various embodiments, the pairing service can be maintained or managed by a service provider corresponding to a user account. Alternatively, the pairing service can be maintained or managed by a third-party service provider that is different from the service provider corresponding to the user account.

At step 604, a host device generates a one-time secret (OTS). In some embodiments, the OTS is a random number. The OTS is regenerated each time the security protocol is executed. In other words, a different OTS is generated each time the host device attempts to access a user account via a service over a network. In other embodiments, the OTS is a random m-digit value. In yet other embodiments, the OTS can be represented as a random byte sequence of m-bytes or, more generally, a random bit sequence of m-bits.

At step 606, the host device generates a representation of the session identifier. The representation can also encode the OTS. In some embodiments, the representation is implemented as a QR code that encodes a specific URL associated with the security protocol. The URL can direct an application on a trusted client device to confirm the identity of a user of the trusted client device. The URL can include the session identifier. The OTS can also be encoded within the representation.

At step 608, the host device confirms key exchange with the trusted client device. In some embodiments, the host device receives a public value calculated by the trusted client device, based on the OTS and a private random number generated by the trusted client device, from the trusted client device. The host device also transmits a public value calculated by the host device, based on the OTS and a private random number generated by the host device, to the trusted client device. The public values are shared via an unprotected communication session established through the relay server based on the session identifier.

At step 610, the host device receives ephemeral credentials to access the user account from the trusted client device. In some embodiments, the host device receives encrypted ephemeral credentials from the trusted client device via a protected communication session established via the relay server. The host device decrypts the ephemeral credentials using the shared secret key K. The host device can then utilize the ephemeral credentials to sign in to the user account via the service.

Figure 7:
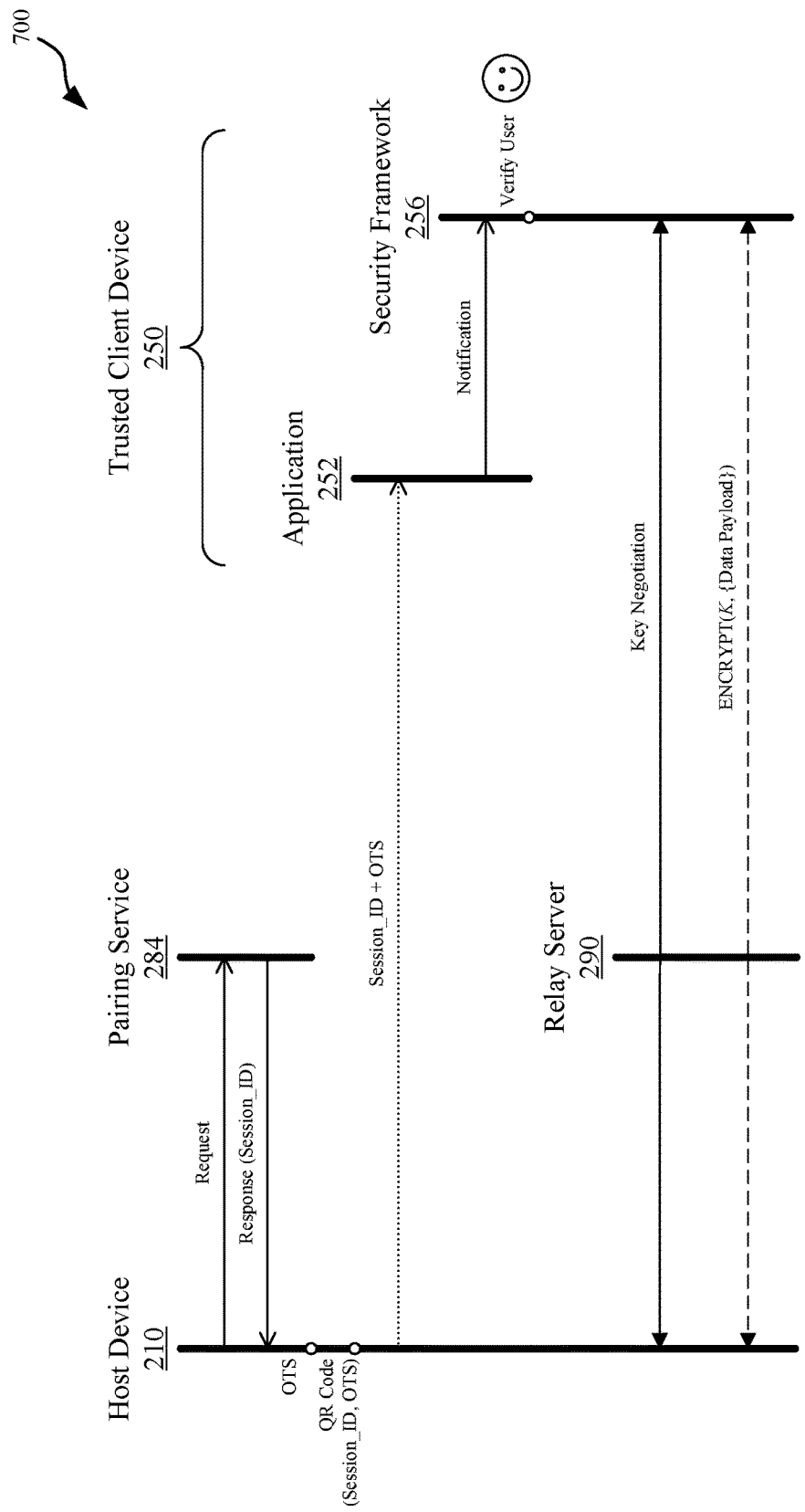
FIG. 7 illustrates a security protocol for establishing a protected communication session between a host device and a trusted client device, in accordance with some embodiments.

FIG. 7 illustrates a security protocol 700 for establishing a protected communication session between a host device 210 and a trusted client device 250, in accordance with some embodiments. The security protocol 300 utilized to sign into a user account via a service 282 can also be utilized, at least in part, for other purposes. For example, a user may want to share data with an application on a host device 210, utilizing the trusted client device 250 as a means for sharing the data in a protected manner.

As shown in FIG. 7, the host device 210 can request a session identifier from the pairing service 284 and generate an OTS similar to the security protocol 300. The session identifier and OTS are then encoded within a representation of the session identifier that is sent to the trusted client device 250 via the out-of-band communication channel. The application 252 decodes the session identifier and OTS from the representation and notifies the security framework that a protected communication session should be established through the relay server 290. The security framework 256 verifies the identity of a user of the trusted client device 250 and then proceeds to negotiate key exchange between the trusted client device 250 and the host device 210. In some embodiments, the security framework 256 is configured to verify the identity of the user via the SEP 314.

In some embodiments, a shared secret key K is negotiated according to an SRP protocol. In other embodiments, public keys for the host device 210 and a trusted client device 250 are exchanged as part of an asymmetric key algorithm. In yet other embodiments, a Diffie-Hellman algorithm is utilized to exchange a shared secret key K.

Once the keys are exchanged, the protected communication session can be established between the host device 210 and the trusted client device 250 through the relay server 290. Unlike security protocol 300, where a PET is transmitted to the host device 210 to sign in to a user account through a service 282, the security protocol 700 can be utilized to simply exchange generic data payloads encrypted based on the negotiated keys. The data payload can be any type of data that is exchanged in a protected manner between the trusted client device 250 and the host device 210. Thus, the protected communication session enables a variety of different applications to utilize the encrypted channel between the host device 210 and the trusted client device 250.

For example, one application that could be useful is to use the trusted client device 250 as a key repository. Data is encrypted with keys generated and stored on the trusted client device 250, such as keys managed by SEP 314. The encrypted data can then be stored on the trusted client device 250 or transmitted to a cloud-based storage service. The service cannot access the encrypted data because the keys are not shared with the service by the trusted client device 250. An application on the host device 210 can access the encrypted data through the service using the trusted client device 250. For example, the application 212 can request the encrypted data from the service through the security framework 256 on the trusted client device 250. The security framework 256 access the encrypted data, either from a local storage device or a remote storage device such as the cloud-based storage service, and decrypts the data using the key stored on the trusted client device 250. The decrypted data is then re-encrypted using the shared secret key K and transmitted to the host device 210 via the protected communication session established through the relay server 290. The host device 210 can then decrypt the data using the shared secret key K.

In some embodiments, this type of application can be utilized to display photos on the host device 210 that are encrypted and stored remotely on the cloud-based storage service. The host device 210 cannot decrypt the photos directly without the keys stored in the key repository on the trusted client device 250. Therefore, the trusted client device 250 is required to be able to access the photos on an application on the host device 210. Thus, the trusted client device 250 is integral to enabling a user to access the encrypted data from a host device 210.

In a variant of the above application, data encrypted using keys stored on the trusted client device 250 can be stored using a remote storage service. The private keys can then be split into key portions, each key portion provided to a different actor external to the trusted client device 250. The encrypted data can then only be decrypted after all actors have decrypted the encrypted data with a corresponding portion of the key. This split-key concept can be utilized to prevent any single device, including the host device 210, from being able to decrypt the encrypted data without utilizing another actor (e.g., service) that is different from the device.

Figure 8:
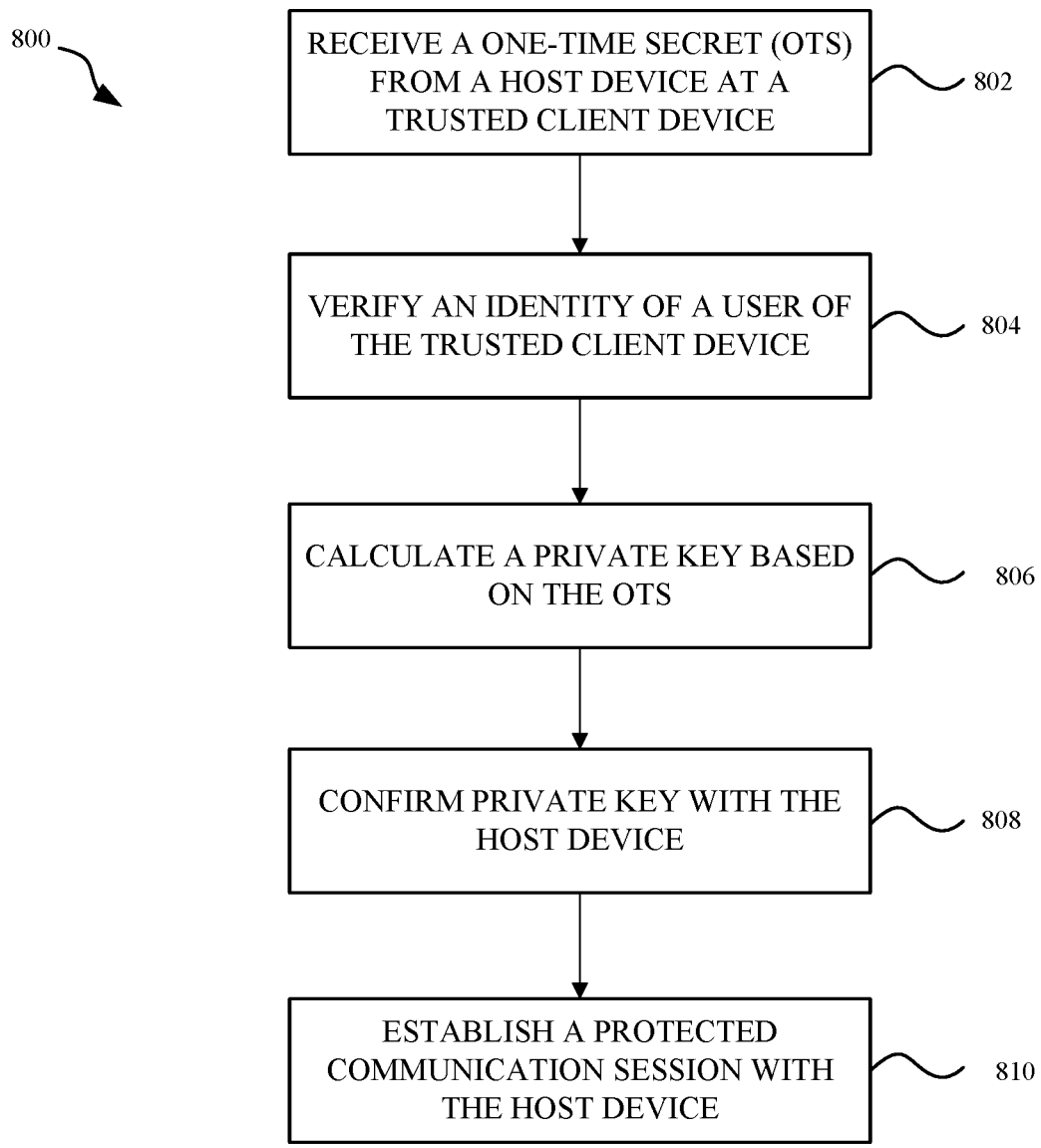
FIG. 8 illustrates a flowchart of an exemplary method for implementing a security protocol utilizing a trusted client device, in accordance with some embodiments.

FIG. 8 illustrates a flowchart of an exemplary method 800 for implementing a security protocol utilizing a trusted client device, in accordance with some embodiments. The method 800 can be performed by hardware, software executed by a processor, or any combination of hardware and software. In some embodiments, the method 800 can be implemented, at least in part, by the trusted client device 250.

At step 802, a trusted client device 250 receives a one-time secret (OTS) from a host device 210. The OTS is received via an out-of-band communication channel as encoded within a representation of a session identifier. In some embodiments, the OTS is a random number generated by a random number generator implemented by the host device 210. The random number generator can be implemented in hardware, software, or a combination of hardware and software.

At step 804, an identity of a user is verified by the trusted client device 250. In some embodiments, the identity of the user is verified using a fingerprint sensor. In other embodiments, the identity of the user is verified using an image of the user's face and a corresponding depth map captured by an image sensor and depth sensor, respectively, of the trusted client device 250.

At step 806, the trusted client device 250 calculates a private key based on the OTS. In some embodiments, the trusted client device 250 generates a random number and calculates the private key utilizing an equation based on the random number and the OTS. In some embodiments, the trusted client device 250 shares information with the host device 210 that enables the host device 210 to also calculate the same private key utilizing the OTS.

At step 808, the trusted client device 250 confirms the private key with the host device 210. In some embodiments, the confirmations can comprise exchange of information that establishes a zero-knowledge proof that the host device 210 and the trusted client device 250 have correctly calculated the same value for the private key.

At step 810, the trusted client device 250 establishes a protected communication session with the host device 210. In some embodiments, the protected communication session is established through a relay server 290 utilizing the session identifier. The data transmitted via the protected communication session can be encrypted/decrypted using the private key. Data can be exchanged in a bidirectional fashion via the protected communication session.

Figure 9:
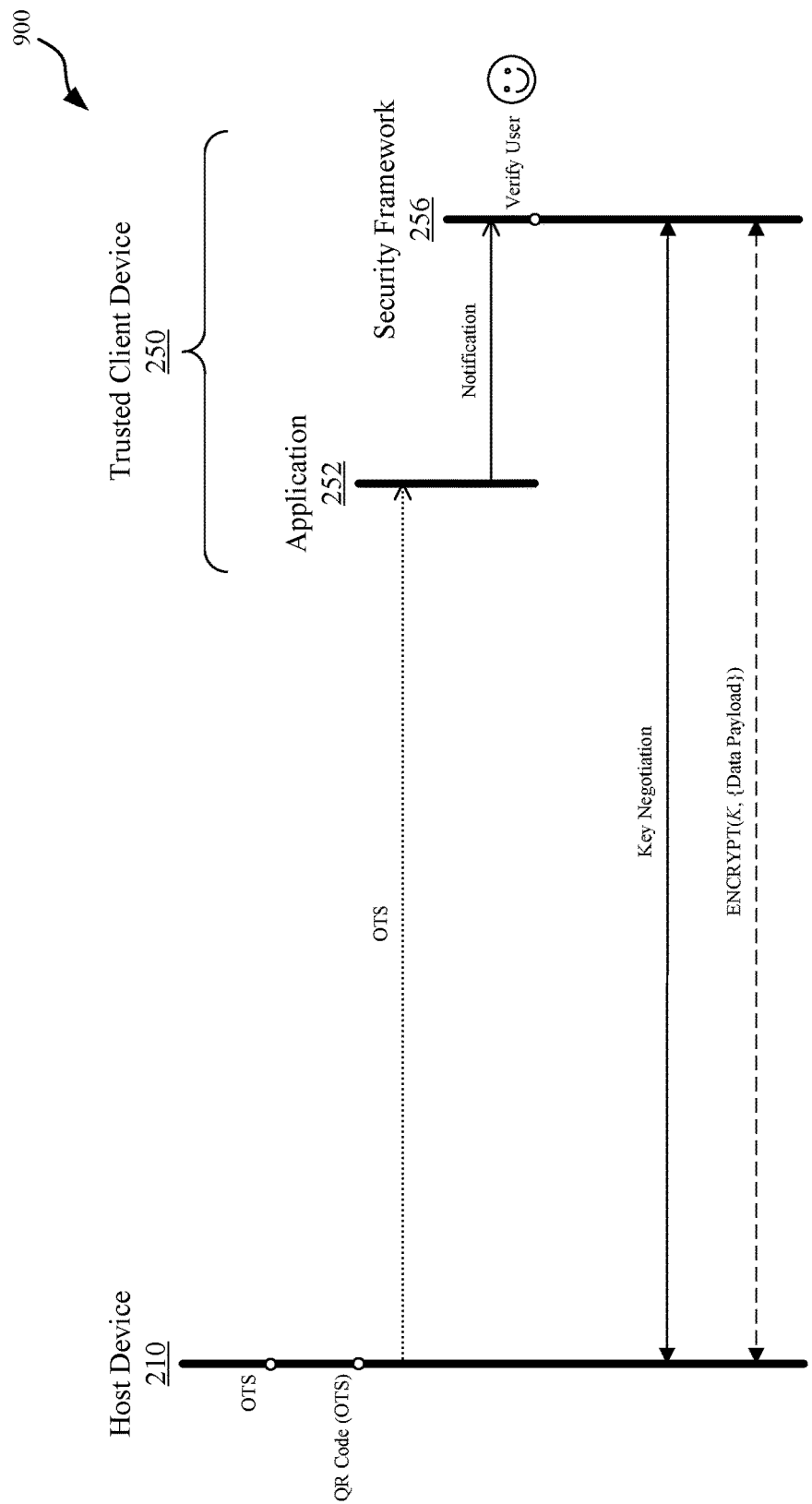
FIG. 9 illustrates a security protocol for establishing a protected communication session between a host device and a trusted client device, in accordance with some embodiments.

FIG. 9 illustrates a security protocol 900 for establishing a protected communication session between a host device 210 and a trusted client device 250, in accordance with some embodiments. The security protocol 300 and the security protocol 700 establish the protected communication session utilizing the relay server 290. However, in some embodiments, the relay server 290 can be omitted and the host device 210 and the trusted client device 250 can establish a communication session through a direct channel.

As shown in FIG. 9, the host device 210 generates a one-time secret (OTS), similar to security protocol 300 and 700. The host device 210 then encodes the OTS within a representation such as a QR code or an ultrasonic chirp. The host device 210 provides the representation of the OTS to the trusted client device 250 via an out-of-band communication channel. In some embodiments, the representation of the OTS can also include information that enables a trusted client device 250 to establish a direct communication channel with the host device 210. For example, the representation can encode a network address and/or a port number that enables the trusted client device 250 to connect to a port of a network interface of the host device 210 via a wireless network. In some embodiments, the representation can also encode a SSID and credentials to connect to a wireless network access point implemented by the host device 210 and/or a separate network device such as a wireless access point.

The trusted client device 250 decodes the OTS and verifies the identity of a user of the trusted client device 250. In some embodiments, the trusted client device 250 utilizes the SEP 314 to verify a user's identity. The security framework 256 may prevent keys from being generated utilizing the OTS until a user's identity has been verified by the SEP 314.

The trusted client device 250 connects to the host device 210 directly using the information provided in the representation of the OTS. The trusted client device 250 and the host device 210 then negotiate encryption keys utilizing one of the aforementioned protocols, such as the SRP protocol. Finally, the direct communication channel can then be utilized to establish a protected communication session using the negotiated encryption keys.

Figure 10:
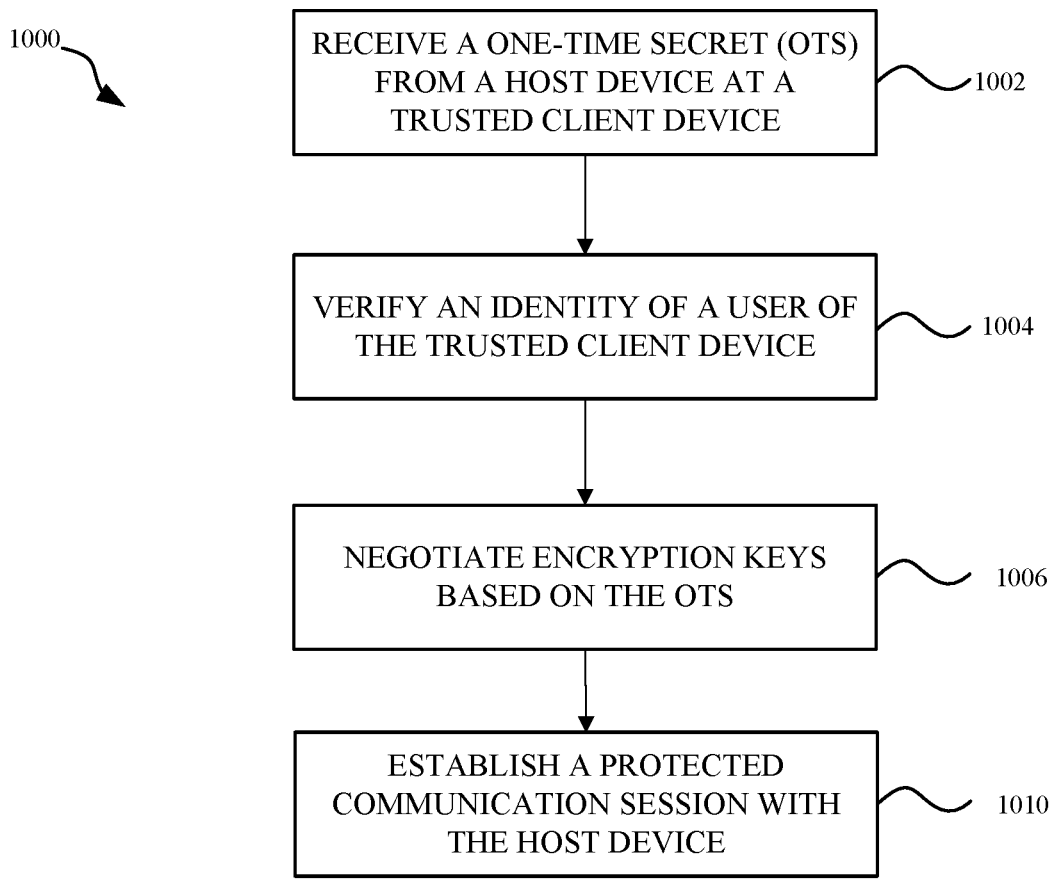
FIG. 10 illustrates a flowchart of an exemplary method for implementing a security protocol utilizing a trusted client device, in accordance with some embodiments.

FIG. 10 illustrates a flowchart of an exemplary method 800 for implementing a security protocol utilizing a trusted client device, in accordance with some embodiments. The method 1000 can be performed by hardware, software executed by a processor, or any combination of hardware and software. In some embodiments, the method 1000 can be implemented, at least in part, by the trusted client device 250.

At step 1002, a trusted client device 250 receives a one-time secret (OTS) from a host device 210. The OTS is received via an out-of-band communication channel as encoded within a representation of the OTS. The representation can also encode additional information that enables the trusted client device 250 to establish a direct communication channel with the host device 210. In some embodiments, the OTS is a random number generated by a random number generator implemented by the host device 210. The random number generator can be implemented in hardware, software, or a combination of hardware and software.

At step 1004, an identity of a user is verified by the trusted client device 250. In some embodiments, the identity of the user is verified using a fingerprint scanner. In other embodiments, the identity of the user is verified using an image of the user's face and a corresponding depth map captured by an image sensor and depth sensor, respectively, of the trusted client device 250.

At step 1006, the trusted client device 250 negotiates encryption keys with the host device 210 based on the OTS. In some embodiments, negotiation can be conducted via a direct communication channel established between the trusted client device 250 and the host device 210. The encryption keys are negotiated via an unprotected communication session, and the encryption keys themselves are never transmitted directly over the direct communication channel.

At step 1008, the trusted client device 250 establishes a protected communication session with the host device 210. In some embodiments, the protected communication session is established utilizing the direct communication channel. The data transmitted via the protected communication session can be encrypted/decrypted using the encryption keys. Data can be exchanged in a bidirectional fashion via the protected communication session.

Figure 11:
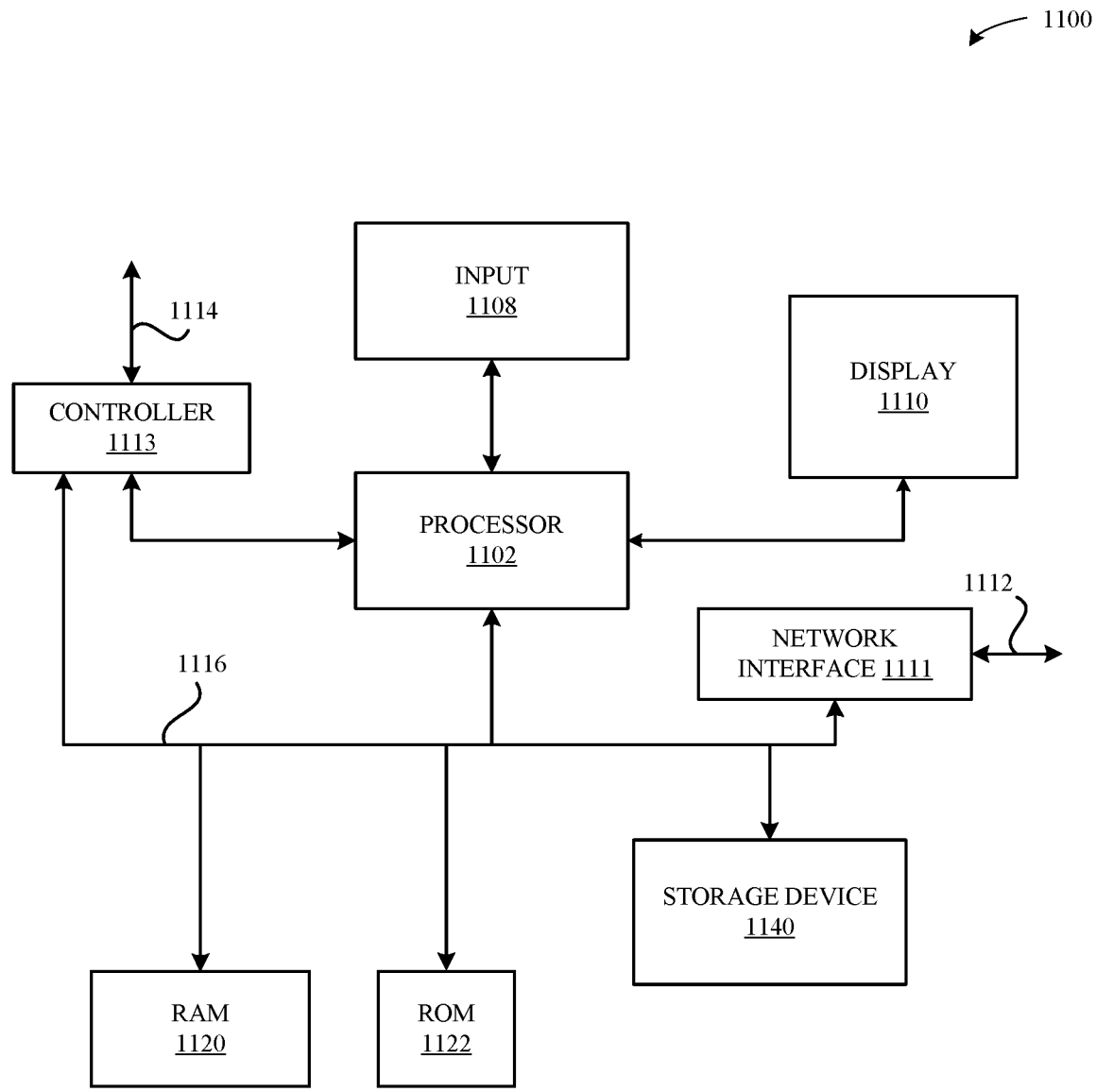
FIG. 11 illustrates a detailed view of an exemplary computing device that can be used to implement the various apparatus and/or methods described herein, in accordance with some embodiments.

FIG. 11 illustrates a detailed view of an exemplary computing device 1100 that can be used to implement the various apparatus and/or methods described herein, in accordance with some embodiments. In particular, the detailed view illustrates various components that can be included in the computing devices illustrated in FIGS. 1 and 2 and/or described herein. For example, one or more of the mobile phone 152, tablet computer 154, laptop computer 156, set top box 112, display 114, host device 210, trusted client device 250, server 280, or relay server 290, or any other device including any network device, computing device, and/or server computing device described herein can include the components of computing device 1100.

As shown in FIG. 11, the computing device 1100 includes a processor 1102 that represents a microprocessor or controller for controlling the overall operation of computing device 1100. The computing device 1100 can also include a user input device 1108 that allows a user of the computing device 1100 to interact with the computing device 1100. For example, the user input device 1108 can take a variety of forms, such as a button, keypad, dial, touch screen, audio input interface, visual/image capture input interface, input in the form of sensor data, etc. Still further, the computing device 1100 can include a display 1110 (screen display) that can be controlled by the processor 1102 to present visual information to the user. A data bus 1116 can facilitate data transfer between at least a storage device 1140, the processor 1102, and a controller 1113. The controller 1113 can be used to interface with and control different equipment through an equipment control bus 1114. The computing device 1100 can also include a network/bus interface 1111 that couples to a data link 1112. In the case of a wireless connection, the network/bus interface 1111 can include a wireless transceiver.

In some embodiments, the processor 1102 can be embodied in a variety of forms. For example, the processor 1102 can be embodied as various processing hardware-based means such as a microprocessor, a coprocessor, a controller or various other computing or processing devices including integrated circuits such as, for example, an application specific integrated circuit (ASIC), a field programmable gate array (FPGA), some combination thereof, or the like. Although illustrated as a single processor, it will be appreciated that the processor 1102 can include two or more processors. The processors can be in operative communication with each other and can be collectively configured to perform one or more functionalities of the computing device 1100 as described herein. In some embodiments, the processor 1102 can be configured to execute instructions that can be stored in the RAM 1120 or that can be otherwise accessible to the processor 1102.

The computing device 1100 also include a storage device 1140, which can comprise a single disk or a plurality of disks (e.g., hard drives), and includes a storage management module that manages one or more partitions within the storage device 1140. In some embodiments, storage device 1140 can include flash memory, semiconductor (solid state) memory or the like. The computing device 1100 can also include a Random-Access Memory (RAM) 1120 and a Read-Only Memory (ROM) 1122. The ROM 1122 can store programs, utilities or processes to be executed in a non-volatile manner. The RAM 1120 can provide volatile data storage, and stores instructions related to the operation of the computing device 1100.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for implementing a security protocol, the method comprising, by a trusted client device:
   obtaining a one-time secret (OTS) displayed by a host device;
   extracting information encoded within the OTS;
   utilizing the information to transmit, to the host device, at least one message that causes the host device to transition from displaying the OTS to displaying instructions for verifying an identity of a user of the trusted client device;
   verifying the identity of the user using at least one sensor of the trusted client device;
   in response to verifying the identity of the user:
      negotiating an encryption key with the host device based on the OTS,
      establishing, using the encryption key, a communication session between the trusted client device and the host device; and
   providing, via the communication session, credentials to the host device to enable the host device to perform at least one action.

2. The method of claim 1, wherein the OTS is encoded within a representation of a session identifier that is received by the trusted client device via an out-of-band communication channel.

3. The method of claim 2, wherein the representation of the session identifier comprises a Quick Response (QR) code that is received at the trusted client device via an application configured to capture an image of the QR code using an image sensor.

4. The method of claim 1, wherein the OTS is a random number generated by the host device and encoded with m-bits.

5. The method of claim 1, wherein the at least one action comprises the host device accessing services associated with a user account for a duration of time.

6. The method of claim 5, wherein the trusted client device requests the credentials from an identification service associated with a service provider that maintains the user account.

7. The method of claim 1, wherein the communication session is established through a relay connection implemented by a relay server, the relay connection is associated with a session identifier provided to the host device by a pairing service.

8. The method of claim 1, further comprising:
   encrypting a data payload utilizing the encryption key to produce an encrypted data payload; and
   transmitting the encrypted data payload via the communication session.

9. The method of claim 1, wherein a machine token for the trusted client device is associated with a user account.

10. The method of claim 1, wherein verifying the identity of the user comprises collecting biometric data utilizing a fingerprint sensor.

11. The method of claim 1, wherein verifying the identity of the user comprises collecting biometric data utilizing an image sensor and a depth sensor.

12. The method of claim 1, wherein verifying the identity of the user comprises requesting a secure enclave processor (SEP) to verify the identity of the user.

13. At least one non-transitory computer readable storage medium configured to store instructions that, when executed by at least one processor included in a trusted client device, cause the trusted client device to implement a security protocol, by carrying out steps that include:

obtaining a one-time secret (OTS) displayed by a host device;
extracting information encoded within the OTS;
utilizing the information to transmit, to the host device, at least one message that causes the host device to transition from displaying the OTS to displaying instructions for verifying an identity of a user of the trusted client device;
verifying the identity of the user using at least one sensor of the trusted client device;
in response to verifying the identity of the user:
negotiating an encryption key with the host device based on the OTS,
establishing, using the encryption key, a communication session between the trusted client device and the host device; and
providing, via the communication session, credentials to the host device to enable the host device to perform at least one action.

14. The at least one non-transitory computer readable storage medium of claim 13, wherein the OTS is encoded within a representation of a session identifier that is received by the trusted client device via an out-of-band communication channel.

15. The at least one non-transitory computer readable storage medium of claim 13, wherein the at least one action comprises the host device accessing services associated with a user account for a duration of time.

16. The at least one non-transitory computer readable storage medium of claim 13, wherein the communication session is established through a relay connection implemented by a relay server.

17. The at least one non-transitory computer readable storage medium of claim 13, wherein verifying the identity of the user comprises collecting biometric data utilizing an image sensor and a depth sensor.

18. A trusted client device, comprising:
at least one processor; and
at least one memory storing instructions that, when executed by the at least one processor, cause the trusted client device to implement a security protocol, by carrying out steps that include:
obtaining a one-time secret (OTS) displayed by a host device;
extracting information encoded within the OTS;
utilizing the information to transmit, to the host device, at least one message that causes the host device to transition from displaying the OTS to displaying instructions for verifying an identity of a user of the trusted client device;
verifying the identity of the user using at least one sensor of the trusted client device;
in response to verifying the identity of the user:
negotiating an encryption key with the host device based on the OTS,
establishing, using the encryption key, a communication session between the trusted client device and the host device; and
providing, via the communication session, credentials to the host device to enable the host device to perform at least one action.

19. The trusted client device of claim 18, wherein the OTS is encoded within a representation of a session identifier that is received by the trusted client device via an out-of-band communication channel.

20. The trusted client device of claim 19, wherein the representation of the session identifier comprises a Quick Response (QR) code that is received at the trusted client device via an application configured to capture an image of the QR code using an image sensor.

* * * * *